US 12,152,898 B2

(12) United States Patent
Saito et al.

(10) Patent No.: US 12,152,898 B2
(45) Date of Patent: Nov. 26, 2024

(54) INFORMATION PROCESSOR, INFORMATION PROCESSING METHOD, AUDIO OUTPUT SYSTEM, AND COMPUTER-READABLE RECORDING MEDIUM

(71) Applicant: SUBARU CORPORATION, Tokyo (JP)

(72) Inventors: Kazutaka Saito, Tokyo (JP); Toshiyuki Omura, Tokyo (JP); Atsushi Yasumuro, Tokyo (JP); Kazumasa Miura, Tokyo (JP); Masami Oishi, Tokyo (JP); Hideki Ogawa, Saitama (JP); Masanobu Tanaka, Saitama (JP)

(73) Assignee: SUBARU CORPORATION, Tokyo (JP)

( * ) Notice: Subject to any disclaimer, the term of this patent is extended or adjusted under 35 U.S.C. 154(b) by 642 days.

(21) Appl. No.: 16/847,063

(22) Filed: Apr. 13, 2020

(65) Prior Publication Data
US 2021/0063190 A1 Mar. 4, 2021

(30) Foreign Application Priority Data
Aug. 29, 2019 (JP) .................................. 2019-157225

(51) Int. Cl.
G01C 21/36 (2006.01)
G01C 21/34 (2006.01)
(Continued)

(52) U.S. Cl.
CPC ..... *G01C 21/3629* (2013.01); *G01C 21/3407* (2013.01); *G01S 19/396* (2019.08); *G01S 19/42* (2013.01)

(58) Field of Classification Search
CPC ............ G01C 21/3629; G01C 21/3407; G01S 19/396; G01S 19/42; G06F 3/165
(Continued)

(56) References Cited

U.S. PATENT DOCUMENTS 5,583,775 A * 12/1996 Nobe .................. G01C 21/3655
                                                    701/428
6,128,571 A * 10/2000 Ito ...................... G01C 21/3679
                                                    701/426
(Continued)

FOREIGN PATENT DOCUMENTS

EP       2423644 A2 *   2/2012 ............. G01C 21/20
JP     H08-327387 A    12/1996
(Continued)

OTHER PUBLICATIONS

Office Action issued in corresponding Japanese Patent Application No. 2019-157225, dated Apr. 25, 2023, with English translation.
(Continued)

*Primary Examiner* — Marc Burgess
*Assistant Examiner* — Merritt E Levy
(74) *Attorney, Agent, or Firm* — Rimon P.C.

(57) ABSTRACT

An information processor includes an acquisition unit, a course setting unit, a registration unit, a detection unit, a first determination unit, and a controller. The acquisition unit acquires information regarding a via-point. The course setting unit sets a course from a starting point to a destination point through the via-point. The registration unit performs registration processing. The registration processing includes associating sound data with the via-point. The first determination unit determines whether or not a current position detected by the detection unit is within a predetermined range from the via-point. The controller makes an output control of the sound data associated by the registration
(Continued)

processing, on the basis of a determination result by the first determination unit.

19 Claims, 18 Drawing Sheets

(51) Int. Cl.
*G01S 19/39* (2010.01)
*G01S 19/42* (2010.01)

(58) Field of Classification Search
USPC .......................................................... 701/425
See application file for complete search history.

(56) References Cited

U.S. PATENT DOCUMENTS

| | | | |
|---|---|---|---|
| 6,266,614 B1* | 7/2001 | Alumbaugh | G01C 21/3679 701/516 |
| 2004/0215388 A1 | 10/2004 | Takenaka | |
| 2006/0015249 A1* | 1/2006 | Gieseke | G08G 1/096872 340/995.19 |
| 2007/0032947 A1* | 2/2007 | Yamada | G01C 21/3896 701/532 |
| 2007/0067104 A1* | 3/2007 | Mays | G01C 21/3647 701/437 |
| 2009/0105934 A1* | 4/2009 | Tajima | G01C 21/3617 701/439 |
| 2009/0143977 A1* | 6/2009 | Beletski | G01C 21/343 701/533 |
| 2010/0049432 A1* | 2/2010 | Chou | G01C 21/3623 701/533 |
| 2010/0088023 A1* | 4/2010 | Werner | G01C 21/20 455/566 |
| 2010/0094550 A1* | 4/2010 | Tsurutome | G01C 21/3476 455/456.1 |
| 2010/0332131 A1* | 12/2010 | Horvitz | G01C 21/3697 701/414 |
| 2011/0035148 A1* | 2/2011 | Machino | G01C 21/3415 701/533 |
| 2012/0022777 A1* | 1/2012 | James | G01C 21/343 701/438 |
| 2012/0130631 A1* | 5/2012 | Chen | G01C 21/3629 701/418 |
| 2012/0323485 A1* | 12/2012 | Mutoh | G01S 19/13 701/428 |
| 2013/0253833 A1* | 9/2013 | Tuukkanen | G06F 3/0481 701/538 |
| 2014/0297617 A1* | 10/2014 | Rajakarunanayake | G06F 16/9537 707/724 |
| 2014/0365068 A1* | 12/2014 | Burns | G10L 13/033 701/31.5 |
| 2016/0378747 A1* | 12/2016 | Orr | G10L 15/26 704/9 |
| 2017/0089720 A1* | 3/2017 | Zhang | H04L 67/52 |
| 2019/0019133 A1* | 1/2019 | Allen | G06Q 10/1053 |
| 2019/0033094 A1* | 1/2019 | Hanai | G06F 16/909 |
| 2019/0049262 A1* | 2/2019 | Grimm | G01C 21/3484 |
| 2019/0072398 A1* | 3/2019 | Balakrishna | G01C 21/3484 |
| 2019/0107414 A1 | 4/2019 | Jin et al. | |
| 2019/0182613 A1* | 6/2019 | Mate | G06F 16/68 |
| 2019/0186939 A1* | 6/2019 | Cox | G06N 20/00 |
| 2019/0353498 A1* | 11/2019 | Eigel | G08G 1/0962 |
| 2020/0318985 A1* | 10/2020 | Kim | G01C 21/3629 |

FOREIGN PATENT DOCUMENTS

| | | | | |
|---|---|---|---|---|
| JP | 2003150176 A | * | 5/2003 | |
| JP | 2003-185453 A | | 7/2003 | |
| JP | 2004212160 A | * | 7/2004 | |
| JP | 2004294262 A | * | 10/2004 | ............ G01C 21/20 |
| JP | 2005050548 A | * | 2/2005 | |
| JP | 2007-248162 A | | 9/2007 | |
| JP | 2008-224508 A | | 9/2008 | |
| JP | 2008251077 A | * | 10/2008 | |
| JP | 4405332 B2 | * | 1/2010 | |
| JP | 2010102104 A | * | 5/2010 | |
| JP | 2010210339 A | * | 9/2010 | |
| JP | 2011095142 A | * | 5/2011 | |
| JP | 4983088 B2 | | 7/2012 | |
| JP | 2019056597 A | * | 4/2019 | |
| JP | 2019-070530 A | | 5/2019 | |
| WO | 2006/109469 A1 | | 10/2006 | |
| WO | WO-2007032389 A1 | * | 3/2007 | |

OTHER PUBLICATIONS

Japanese Notice of Reasons for Refusal issued in corresponding Japanese Patent Application No. 2019-157225, dated Jul. 4, 2023, with English translation.

* cited by examiner

<DRIVE EVENT #1>
 [EVENT INFORMATION]

| EVENT TITLE | DATE | LOCATION | ATTRIBUTES OF FELLOW PASSENGER | VEHICLE MODEL | PURPOSE |
|---|---|---|---|---|---|
| | | | | | |

[COURSE INFORMATION]

| | POSITIONAL INFORMATION | SOUND DESIGNATION INFORMATION |
|---|---|---|
| STARTING POINT | | |
| SB#1 | | |
| NM#1 | | |
| SB#2 | | |
| NM#2 | | |
| SB#3 | | |
| NM#3 | | |
| DESTINATION POINT | | |

[MUSIC INFORMATION]

| | Q1 | Q2 | | | | | Qn |
|---|---|---|---|---|---|---|---|
| FAVORITE MUSIC | | | ・・・・・ | | | | |
| MUSIC STOCK | | | | | | | ・・・ |

FIG. 5

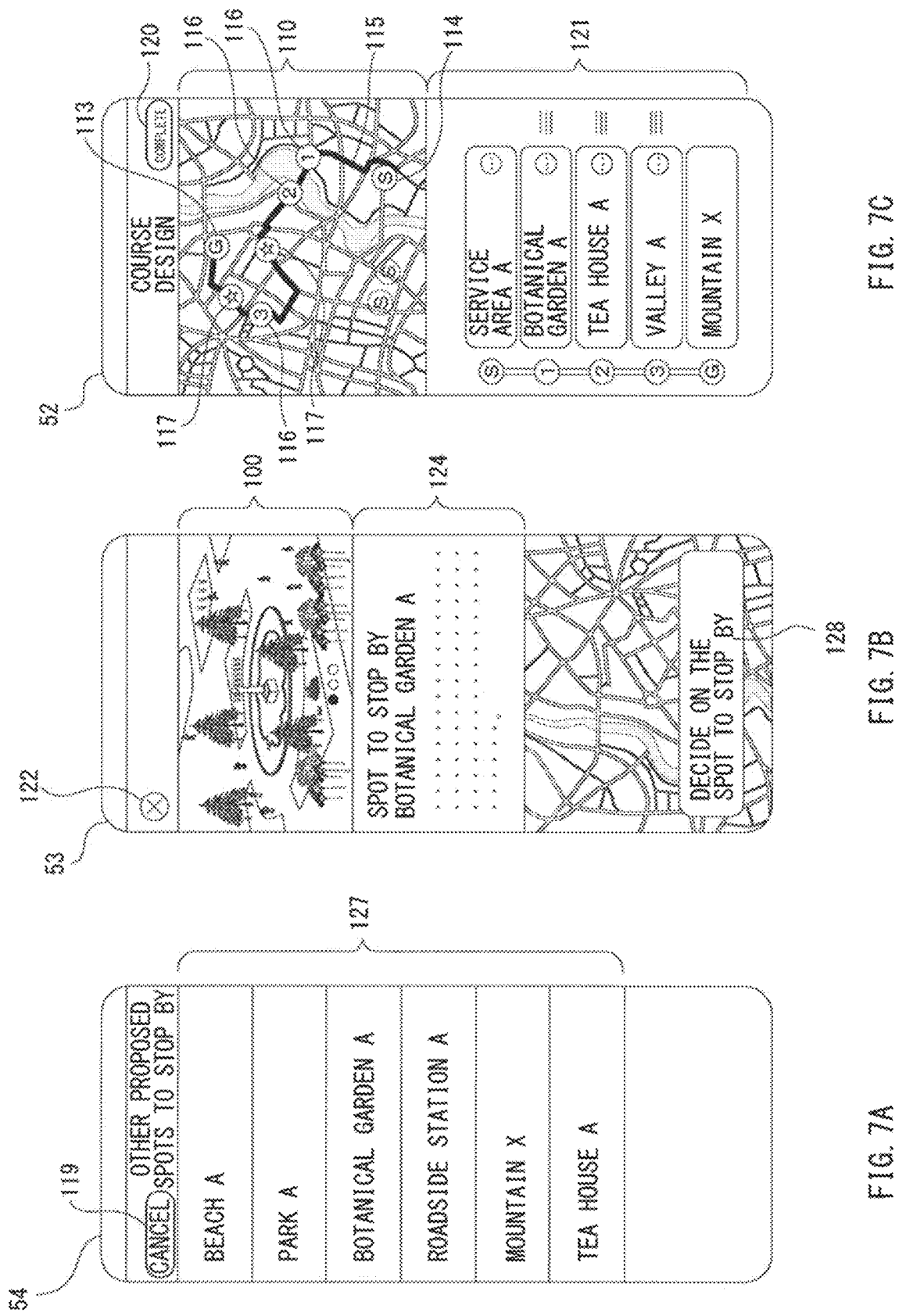

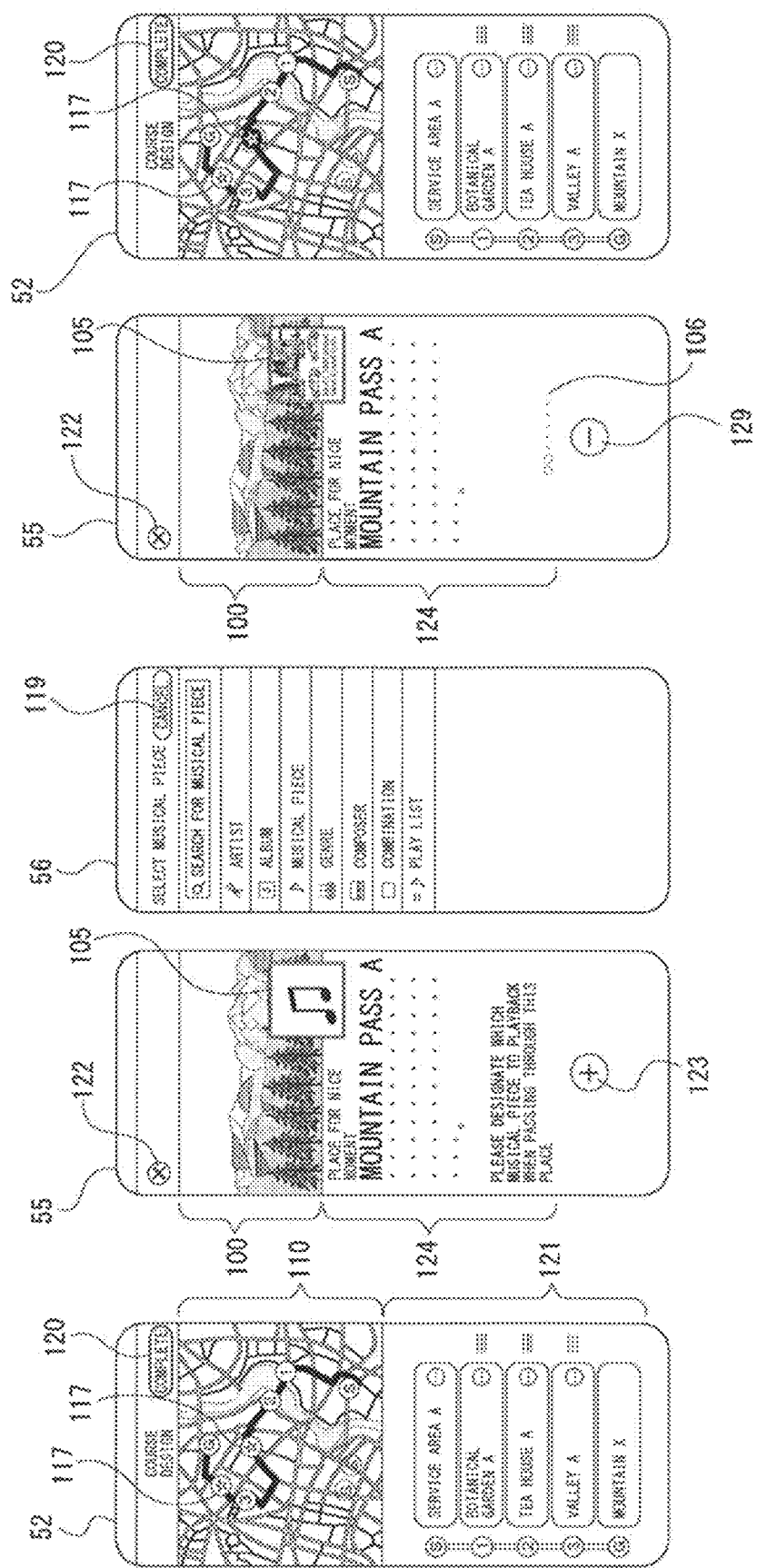

| OUTPUT CONDITIONS | CHARACTER VOICE DESIGNATION INFORMATION | CHARACTER IMAGE DESIGNATION INFORMATION |
|---|---|---|
| · · · · | · · · · | · · · · |
| · · · · | · · · · | · · · · |
| · · · · | · · · · | · · · · |
| · · · · | · · · · | · · · · |
| · · · · | · · · · | · · · · |
| ⋮ | ⋮ | ⋮ |

FIG. 17

INFORMATION PROCESSOR, INFORMATION PROCESSING METHOD, AUDIO OUTPUT SYSTEM, AND COMPUTER-READABLE RECORDING MEDIUM

CROSS-REFERENCE TO RELATED APPLICATIONS

This application claims priority from Japanese Patent Application No. 2019-157225, filed on Aug. 29, 2019, the entire contents of which are hereby incorporated by reference.

BACKGROUND

The technology relates to an information processor, an information processing method, an audio output system, and a computer-readable recording medium. Specifically, the technology relates to route navigation techniques for vehicle travel.

On-vehicle navigation devices have come in wide use. On vehicle navigation devices offer a proposed route on a map, in response to an input of, for example, a starting point and a destination point. On-vehicle navigation devices also provide route guidance on travel.

Japanese Patent (JP-B) No. 4983088 describes a navigation device that collects, from a POI (Point of Interest) database, information regarding a user's purposes and preferences. The navigation device adds the information regarding the user's purposes and preferences to a map including a route from a starting point to a destination point specified by the user. Thus, the navigation device creates specified map data.

SUMMARY

An aspect of the technology provides an information processor including an acquisition unit, a course setting unit, a registration unit, a detection unit, a first determination unit, and a controller. The acquisition unit is configured to acquire information regarding a via-point. The course setting unit is configured to set a course from a starting point to a destination point through the via-point in a singularity or in a plurality. The registration unit is configured to perform registration processing. The registration processing includes associating sound data with the via-point set on the course. The detection unit is configured to detect a current position. The first determination unit is configured to determine whether or not the current position detected by the detection unit is within a predetermined range from the via-point. The controller is configured to make an output control of the sound data associated by the registration processing, on the basis of a determination result by the first determination unit.

An aspect of the technology provides an information processing method including: acquiring information regarding a via-point; setting a course from a starting point to a destination point through the via-point in a singularity or in a plurality; performing registration processing, the registration processing including associating sound data with the via-point set on the course; detecting a current position; determining whether or not the current position detected by the detecting is within a predetermined range from the via-point; and making an output control of the sound data associated by the registration processing, on a basis of a determination result of the determining.

An aspect of the technology provides a computer-readable recording medium containing a program. The program causes, when executed by a computer, the computer to implement a method, the method including: acquiring information regarding a via-point; setting a course from a starting point to a destination point through the via-point in a singularity or in a plurality; performing registration processing, the registration processing including associating sound data with the via-point set on the course; detecting a current position; determining whether or not the current position detected by the detecting is within a predetermined range from the via-point; and making an output control of the sound data associated by the registration processing, on a basis of a determination result of the determining.

An aspect of the technology provides an information processor including circuitry. The circuitry is configured to acquire information regarding a via-point. The circuitry is configured to set a course from a starting point to a destination point through the via-point in a singularity or in a plurality. The circuitry is configured to perform registration processing. The registration processing includes associating sound data with the via-point set on the course. The circuitry is configured to detect a current position. The circuitry is configured to determine whether or not the current position detected by the detection unit is within a predetermined range from the via-point. The circuitry is configured to make an output control of the sound data associated by the registration processing, on the basis of a determination result by the first determination unit.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 5 is a diagram of drive event information according to the first embodiment.

FIGS. 7A to 7C are diagrams of screen examples of the course design according to the first embodiment.

FIGS. 8A to 8E are diagrams of screen examples of registration of a musical piece for a nice-moment place according to the first embodiment.

FIG. 17 is a diagram of information for an output of a voice of a character according to the second embodiment.

DETAILED DESCRIPTION

Figure 1:
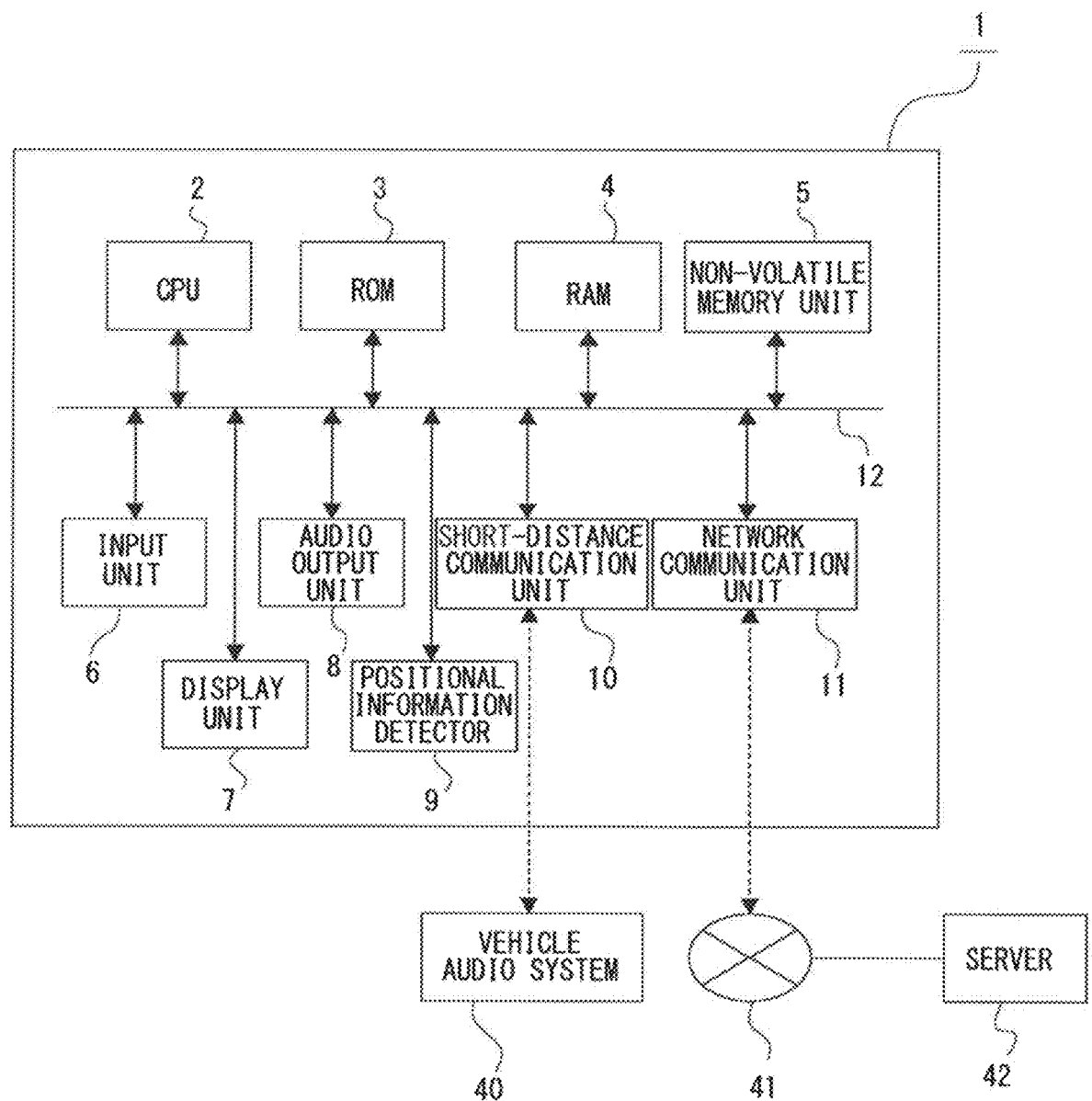
FIG. 1 is a block diagram of an information processor according to an example embodiment of the technology.

Existing navigation devices offer a proposed course from a starting point to a destination point, and display, for example, interesting facilities along a route. However, no proposals have been made for a navigation device that provides a staging effect based on, for example, a purpose, a location, and/or a route of a drive, e.g., a navigation device that provides an audio staging effect that evokes a particular mood inside a cabin.

It is desirable to provide an information processor, an information processing method, an audio output system, and a computer-readable recording medium that make it possible not only to increase operation efficiency by route navigation but also to assist a driver and a fellow passenger in having greater experience and impression during a drive.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

Definitions

First, given are definitions of terms to be used hereinbelow.

A "course" refers to a whole path from a starting point to a destination point, i.e., a goal point. Route guidance includes setting a course in accordance with an input of the starting point and the destination point.

A "route" refers to a course segment between any two points out of the starting point, a stop-by spot, and the destination point. For example, a path from the starting point to a first stop-by spot is called a "route". A path from the first stop-by spot to the next stop-by spot is called a "route". A path from the last stop-by spot to the destination point is called a "route".

A "via-point" is a generic name of places to stop by and places to pass through on the course. Such places may include a "stop-by spot" and a "nice-moment place".

A "stop-by spot", or a spot to stop by, refers to a place registered on the course as a place to stop by before arrival at the destination point. Non-limiting examples of the "stop-by spot" may include facilities, scenic spots, restaurants, and rest houses.

A "nice-moment place", or a place for a nice moment, refers to a location or a road passing through which is expected to give a user great experience. In a case where the user travels along the course by a vehicle, the "nice-moment place" may include, on the basis of characteristics of the vehicle the user is aboard, a location or a road where performance and appealingness of the relevant vehicle are easily appreciated. Non-limiting examples of the characteristics of the vehicle may include specifications and the performance of the vehicle. A "location" as used here may include a point, an area, a section, a region, and a range, as a certain place. A "road" as used here may include all sections of a road, e.g., a range that is given a road name, or alternatively, the "road" as used here may include some of the sections of the road. [Configuration Example of Information Processor]

With reference to FIG. 1, described is a configuration example of an information processor 1 according to an example embodiment of the technology.

The information processor 1 may be a mobile terminal device such as a smartphone. However, this is non-limiting. Specific but non-limiting examples of the information processor 1 may cover a wide range of devices such as personal computers, tablet information processors, mobile phones, game machines, audio devices, and video devices. The information processor 1 is implementable by a device that is able to perform operations as information processing, e.g., a device that incorporates a microcomputer.

In this example embodiment, the information processor 1 is assumed to be used in the route guidance, inside a vehicle as a target of the route guidance.

As illustrated in FIG. 1, the information processor 1 may include a central processing unit (CPU) 2, a read only memory (ROM) 3, a random access memory (RAM) 4, a non-volatile memory unit 5, an input unit 6, a display unit 7, an audio output unit 8, a positional information detector 9, a short-distance communication unit 10, and a network communication unit 11. These units may be coupled to one another by a bus 12, allowing for exchanges of, for example, control signals, data, and detection signals between them as necessary.

The CPU 2 may execute various processing in accordance with a program held by the ROM 3 or a program loaded in the RAM 4 from the non-volatile memory unit 5. The RAM 4 may also hold, as appropriate, data involved in the execution of the various processing by the CPU 2.

The non-volatile memory unit 5 may include, without limitation, a hard disk drive (HDD) and a flash memory. The non-volatile memory unit 5 may hold an application program that carries out processing of this example embodiment and carries out navigation as the route guidance. Moreover, the non-volatile memory unit 5 may also hold information involved in the processing of this example embodiment. Non-limiting examples of such information may include map information, route information, drive event information, sound data, character information, a stop-by spot database, and a nice-moment place database. The route information may be calculated for the navigation. In the following description, the database is abbreviated to "DB".

The drive event information refers to information regarding an operation plan set in accordance with, for example, the user's input and automatic route search processing, in order for the user to go for a drive for a certain destination point. Non-limiting examples of contents of the drive event information are described below.

The sound data refers to audio data to playback and output by the processing of this example embodiment. Non-limiting examples of the sound data may include a musical piece, an audio message, sound effects, and a voice of a character. It is unnecessary for the sound data to be held inside the information processor 1, on an assumption of streaming playback through a network, or playback of data on a musical piece held by an audio system of the vehicle.

Moreover, the sound data may be associated with the "via-point" as mentioned above. The sound data thus associated with the via-point may be registered, to playback and output the sound data near the via-point. Non-limiting examples of the sound data to be associated with the via-point may include a musical piece, an audio message, an audio announcement, and sound effects.

The character information may include various pieces of information to output a character. Description of the character is given in a second embodiment. Non-limiting examples of the character information may include an output condition, as well as information, image data, sound data, and text data corresponding to the output condition.

The stop-by spot DB is a database of information regarding places that make proposed stop-by spots, on an occasion of route search. It is to be noted that in some cases, the stop-by spot makes the destination point. Thus, the stop-by spot DB is a database that holds, for example, locations of, information regarding, and images of various tourist attractions, parking lots, and various facilities that make the destination points and the stop-by spots.

The nice-moment place DB is a database of information regarding locations and roads that make proposed nice-moment places, on the occasion of the route search.

The input unit 6 may comprehensively denote various operators and operation devices such as a keyboard, a mouse, a key, a dial, a touchscreen, a touchpad, and a remote controller. An operation made by the user may be detected by the input unit 6, causing generation of a signal corresponding to the operation thus inputted. The signal may be interpreted by the CPU 2.

The display unit 7 may include a display device such as a liquid crystal display (LCD) and an organic electroluminescence (EL) panel. The display unit 7 may provide the user with display of various kinds of information. The display device included in the display unit 7 may be provided in a housing of the information processor 1, but this is non-limiting. The display device included in the display unit 7 may be a separate display device coupled to the information processor 1.

The display unit 7 may display various images on a display screen, on the basis of instructions from the CPU 2. Moreover, the display unit 7 may provide graphical use interface (GUI) display such as, but not limited to, various operation menus, icons, and messages, on the basis of the instructions from the CPU 2.

The audio output unit 8 may include, for example, a speaker and an amplifier. The audio output unit 8 may output various sounds based on the instructions from the CPU 2. For example, the audio output unit 8 may output audio guidance, on the occasion of the route guidance.

The positional information detector 9 may include a global navigation satellite system (GNSS) sensor. The positional information detector 9 may detect a current position of the information processor 1. Information representing the current position of the information processor 1 detected by the positional information detector 9 may be supplied to the CPU 2 as current positional information. The current positional information inputted to the CPU 2 may be used in processing for the route guidance.

The short-distance communication unit 10 may communicate with various devices, by short-distance wireless communication such as, but not limited to, Bluetooth (registered trademark), Wi-Fi (registered trademark) communication, and near field communication (NFC), and/or by wired communication through, for example, a universal serial bus (USB).

The CPU 2 is able to carry out various data communication with, for example, an information processor provided on vehicle side, through the short-distance communication unit 10.

In this example embodiment, the information processor 1 may carry out wireless communication with an information processor of a vehicle audio system 40 by the short-distance communication unit 10. For example, the CPU 2 may transmit the sound data to the vehicle audio system 40 by the short-distance communication unit 10. The sound data may include, for example, the musical piece held by the non-volatile memory unit 5. The vehicle audio system 40 may receive the sound data, to playback and output, for example, the musical piece with the use of, for example, an audio amplifier and a speaker provided in the vehicle.

The network communication unit 11 may perform communication processing through a network 41.

The network 41 may be, for example, the Internet, a local area network (LAN), a satellite communication network, or any other network.

The CPU 2 is able to carry out various data communication with an external device coupled to the network 41, through the network communication unit 11. In particular, in this example embodiment, the CPU 2 is able to carry out various data communication with an external server 42, through the network communication unit 11.

Figure 2:
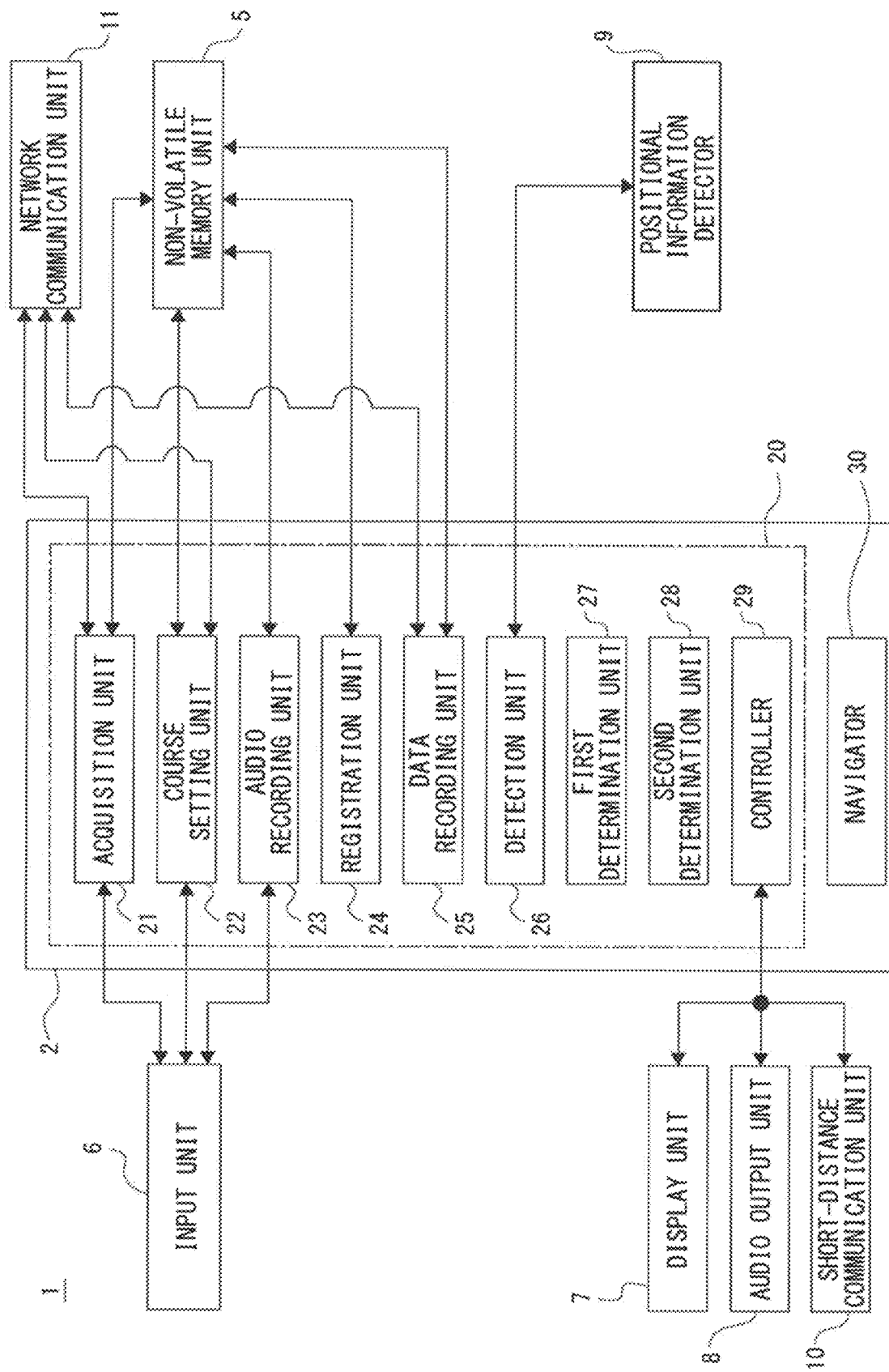
FIG. 2 is a block diagram of a CPU of the information processor according to the example embodiment.

FIG. 2 is a diagram provided for description of a detailed configuration of the CPU 2 of the information processor 1. In FIG. 2, illustrated are subunits in the CPU 2, together with some related units illustrated in FIG. 1.

As illustrated in the figure, the CPU2 may serve as a drive event designer 20 and a navigator 30.

The navigator 30 may perform, for example, the route guidance in accordance with the set course.

The drive event designer 20 may provide setting of a drive event and make an execution control of the drive event, to produce a staging effect for a more fun drive.

The navigator 30 and the drive event designer 20 may include separate application programs and are configured to perform cooperative processing, or alternatively, the navigator 30 and the drive event designer 20 may include an integral application program.

The information processor 1 is able to install software that implements the drive event designer 20 and the navigator 30, by network communication using the network communication unit 11. Alternatively, the software may be installed from a removable recording medium, or may be held, in advance, by the ROM 3 or the non-volatile memory unit 5, without limitation.

In the following, description is given, with the drive event designer 20 focused on.

As illustrated in the figure, the drive event designer 20 may include an acquisition unit 21, a course setting unit 22, an audio recording unit 23, a registration unit 24, a data recording unit 25, a detection unit 26, a first determination unit 27, a second determination unit 28, and a controller 29.

The acquisition unit 21 may acquire information regarding the via-point. In other words, the acquisition unit 21 may acquire information regarding the stop-by spot and the nice-moment place. Such information may be held by the stop-by spot DB and the nice-moment place DB as described above, in the non-volatile memory unit 5. In particular, the acquisition unit 21 may acquire information regarding the stop-by spot and the nice-moment place in accordance with the course or the route set by the course setting unit 22. Alternatively, the acquisition unit 21 may acquire information regarding the stop-by spot that makes the proposed stop-by spot and information regarding the nice-moment place that makes the proposed nice-moment place.

In one alternative, the acquisition unit 21 may be able to acquire the information regarding the via-point from the server 42 through the network communication unit 11.

In addition, the acquisition unit 21 may acquire, in accordance with the user's operation, information regarding a change in the via-point, the information regarding the musical piece to be associated with the via-point, without limitation. That is, the acquisition unit 21 may acquire information inputted by the user, to reflect the information in various processing.

The course setting unit 22 may set the course from the starting point to the destination point through the via-point in a singularity or in a plurality. That is, the course setting unit 22 may set the starting point, at least one via-point, and the destination point.

In this example embodiment, the course setting unit 22 may set the starting point and the destination point on the basis of an operational input from the user through the input unit 6. The input of the starting point and the destination point, and an input of the stop-by spot may be accepted by, for example, a designation input on a map displayed on the display unit 7, and/or a character input, without limitation. The nice-moment place may be automatically set in accordance with the route or the course.

The course thus set may be stored in the non-volatile memory unit 5. On an occasion of an actual drive, the route guidance following the course may be carried out by the navigator 30.

The audio recording unit 23 may perform processing of recording, to the non-volatile memory unit 5, an audio message inputted. For example, the audio recording unit 23 may perform processing of recording the user's utterance, in a case where the user makes an operation of an input of a message and makes the utterance at the time of drive event design.

The registration unit 24 may perform processing of registering the sound data in the non-volatile memory unit 5 in associated relation with the via-point set on the course. For example, the registration unit 24 may perform, without limitation, processing of registering sound designation information in associated relation with the positional information regarding the nice-moment place, to associate, for example, the musical piece with the nice-moment place. The "sound designation information" refers to information regarding designation of the sound data such as the musical piece and the message.

The data recording unit 25 may perform processing of recording, to the non-volatile memory unit 5, the character, the character voice data corresponding to the character, and the output condition of the character voice data in associated relation with one another. The "character" refers to a character such as an imaginary person created for stage effects. In the second embodiment, description is given of an example with the use of a character as a disc jockey (DJ).

The detection unit 26 may perform processing of detecting the current position. That is, the detection unit 26 may be supplied with GNSS reception information by the positional information detector 9, to determine a latitude and a longitude as the current position.

The first determination unit 27 may perform processing of determining whether or not the current position detected by the detection unit 26 is within a predetermined range from the via-point set on the course. In other words, the first determination unit 27 may determine whether or not the current position is in the vicinity of the via-point.

The second determination unit 28 may perform processing of determining whether or not the output condition is satisfied, with regard to the output condition of the character, the character voice data, and character moving image data recorded by the data recording unit 25. Description of this processing is given in the second embodiment.

The controller 29 may perform processing of making an output control of the sound data registered in the non-volatile memory unit 5 in accordance with a determination result by the first determination unit 27. For example, in a case with a determination that the current position is in the vicinity of a certain via-point, the controller 29 may perform a control of, for example, giving an instruction to playback the musical piece associated with the via-point.

Moreover, in a case where the second determination unit 28 determines that the output condition is satisfied, the controller 29 may further perform a control of outputting the character voice data and the character moving image data. The character voice data and the character moving image data may be recorded in the associated relation with the output condition.

As these controls, the controller 29 may perform, for example, a display control of the display unit 7, an audio output control of the audio output unit 8, and a control of transmitting the sound data to the vehicle audio system 40 by the short-distance communication unit 10.

Processing of First Embodiment

In the following, described are processing examples according to a first embodiment. The following processing examples are to be executed by the subunits illustrated in FIG. 2 of the CPU 2 of the information processor 1. FIGS. 4A, 4B, 6A to 6C, 7A to 7C, 8A to 8E, 10A to 10E, 11A to 11E, 12A to 12E, 13A to 13D, and 15A to 15E illustrate examples of image display on the display unit 7 of the information processor 1. The following description of the first and second embodiments assumes a smartphone as the information processor 1, and the examples of the image display in the figures assume a smartphone screen as the display unit 7.

Figure 3:
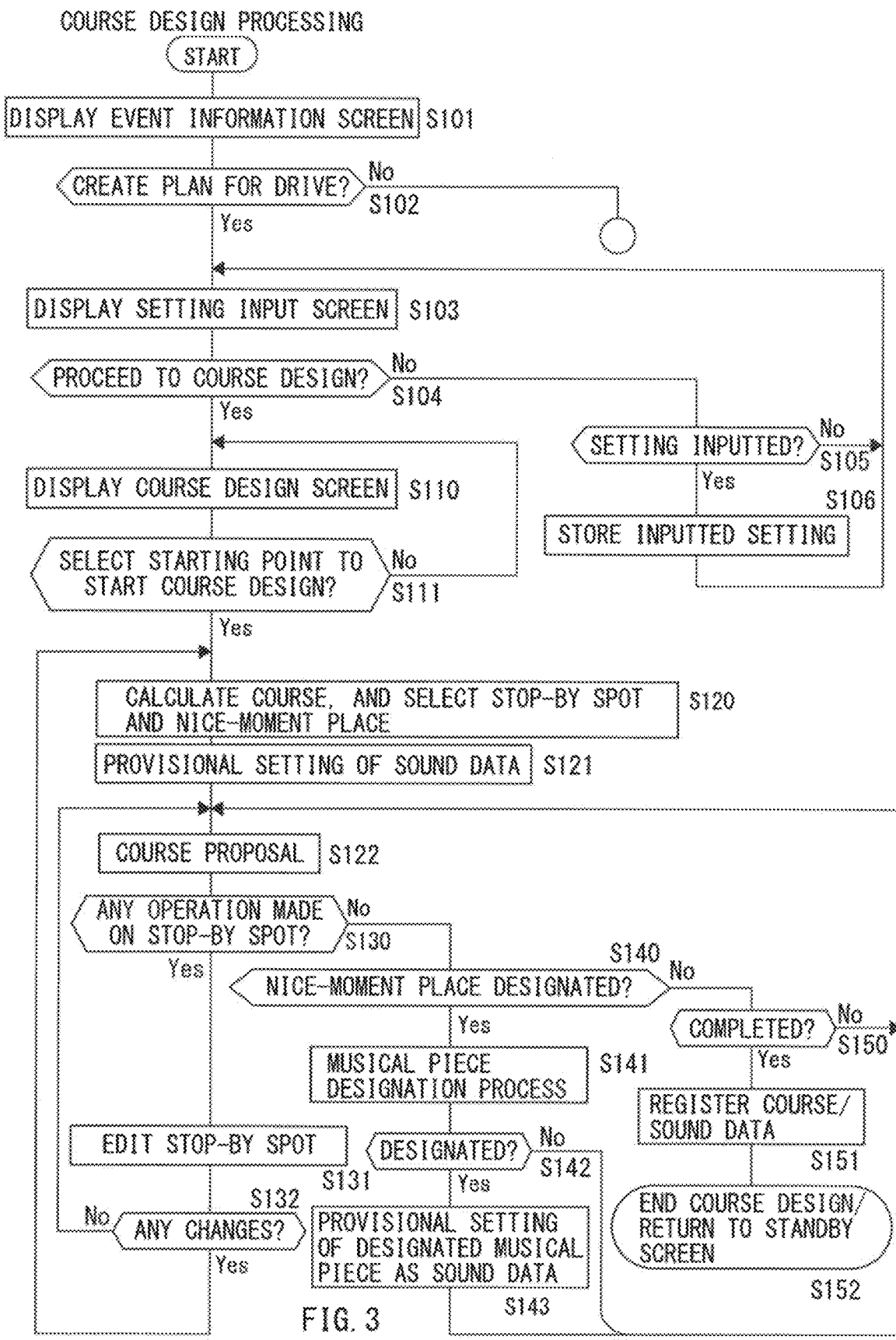
FIG. 3 is a flowchart of course design processing according to a first embodiment.
Figure 4:
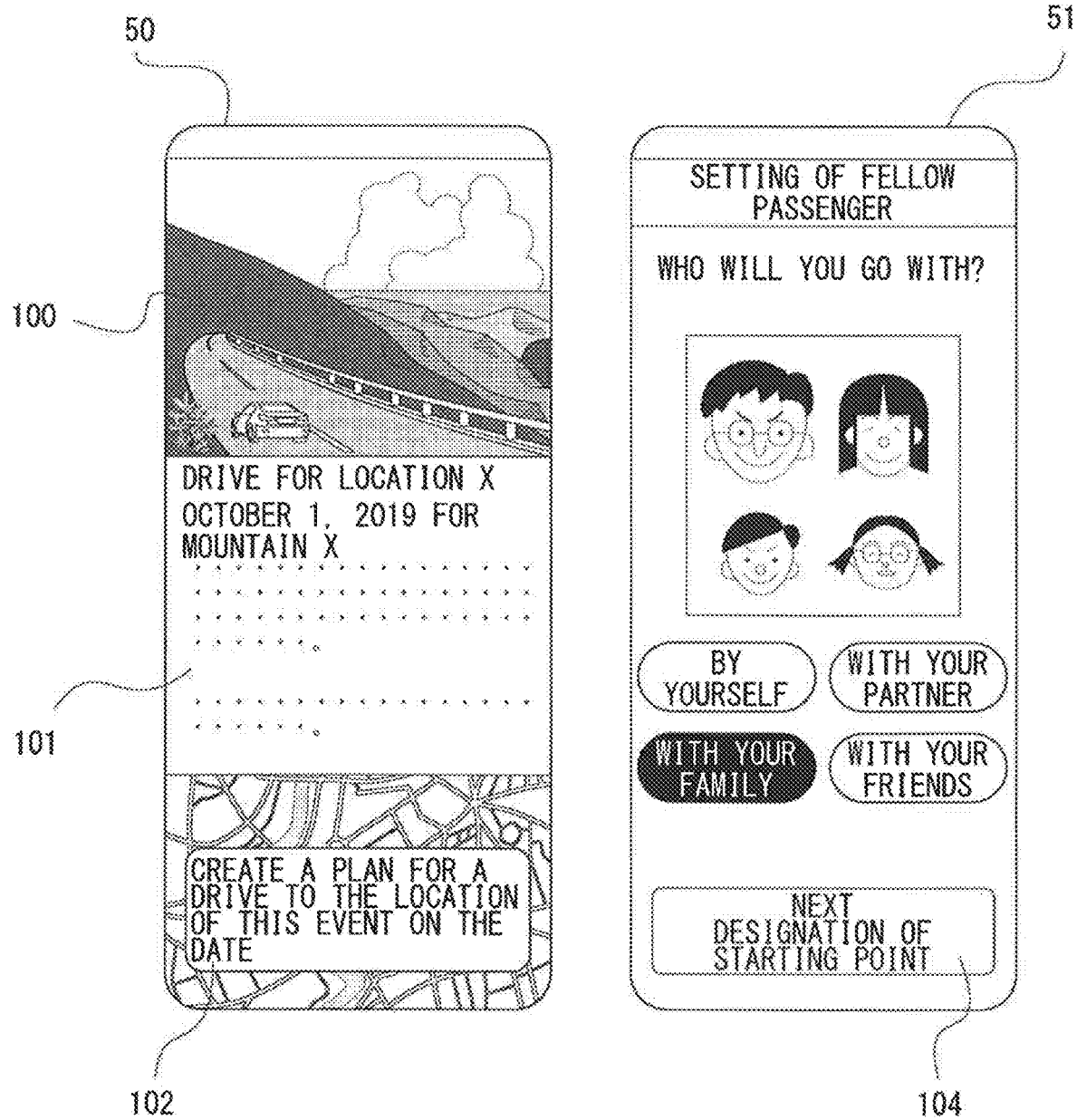
FIGS. 4A and 4B are diagrams of screen examples before a start of course design according to the first embodiment.

FIG. 3 illustrates course design processing to be executed by the CPU 2. The user may start up the application program that implements the drive event designer 20 in the information processor 1, to provide various kinds of setting of a planned drive. The user's operation on a start-up screen of the application program may cause display of an event information screen 50, as illustrated in FIG. 4A. Step S101 in FIG. 3 illustrates display processing of the event information screen 50.

The event information screen 50 may be a top page of a single drive event. The "drive event" as used here refers to the operation plan set in accordance with, for example, the user's input and the automatic route search processing, in order for the user to go for a drive for a certain destination point. In the following, the drive event is also simply called an "event". The event information screen 50 may be displayed, for example, at a start of setting of the drive event, or in response to invocation of the setting of the drive event that has been already made. As illustrated in FIG. 4A, the event information screen 50 may include an image region 100 and an event contents region 101. The image region 100 is provided for image display. The event contents region 101 may include, for example, a date of the drive event, e.g., Oct. 1, 2019, the destination point, e.g., the mountain X, and an introduction note. Thus, the event information screen 50 may provide the user with the contents of the drive event. The event information screen 50 may further include a plan creation button 102.

After the start-up of the application program, the CPU 2 may make, in step S101, a display control of the event information screen 50 as mentioned above, in accordance of the user's operation. In one specific but non-limiting example, the user's input of the date and the destination point may cause the single drive event to be generated and cause the event information screen 50 to be displayed. Non-limiting examples of the introduction note may include sightseeing information regarding the destination point. The CPU 2 may acquire the sightseeing information from the stop-by spot DB or from the server 42, to display the sightseeing information. The stop-by spot DB may be held by the non-volatile memory unit 5.

While the event information screen 50 is on display, the CPU 2 may be on standby for an operation of the plan creation button 102 or other operations.

In a case with the user's operation on the plan creation button 102, e.g., tapping, detected, the CPU 2 may recognize that the operation for the creation of a plan for a drive has been made. Thus, the CPU 2 may cause the flow to proceed from step S102 to step S103, to perform a display control of a setting input screen. In a case with an operation other than the operation of the plan creation button 102 detected, the CPU may proceed to processing corresponding to the detected operation. In a case of no detection of the operation of the plan creation button 102 or other operations, the CPU may continue to cause the event information screen 50 to be displayed.

The "setting input screen" as used here refers to a screen provided for making requests for various inputs. Non-limiting examples of the setting input screen may include a fellow passenger setting screen 51 as illustrated in FIG. 4B, a purpose setting screen, and a vehicle setting screen. The purpose setting screen and the vehicle setting screen are unillustrated.

The purpose setting screen may allow the user to input or select the purpose of the drive event, i.e., an operation purpose. As the purpose of the drive event, the purpose setting screen may allow the user to set, for example, usual sightseeing, a marriage proposal, or a birthday celebration, without limitation.

The vehicle setting screen may allow the user to input, for example, a vehicle model, a category, and a name of a manufacturer of the vehicle to be used on the drive event. For example, the vehicle setting screen may allow the user to input a specific name of a manufacturer and a specific vehicle model. In one alternative, the vehicle setting screen may allow the user to select a vehicle type or the category of the vehicle to be used on the drive event from a list of choices. The list of vehicle types may include, for example, a standard-sized car and a mini car. The list of the category of the vehicle may generally include, for example, a sport utility vehicle (SUV), a compact car, and a family car. It is to be noted that the vehicle setting screen may allow an automobile the user owns to be registered on default.

As to a fellow passenger, the fellow passenger setting screen 51 as illustrated in FIG. 4B may allow the user to make selection from a list of choices. For example, the fellow passenger setting screen 51 may include the list of the choices such as, but not limited to, "by yourself", "with your partner", "with your family", and "with your friends", allowing the user to select any one from the list.

In step S103 in FIG. 3, the CPU 2 may provide display of the setting input screen as described above. In accordance with a setting operation on the screen, the CPU 2 may cause the flow to proceed from step S105 to step S106, to allow the inputted setting to be stored.

FIG. 5 illustrates an example of setting information corresponding to the single drive event, for example, a drive event #1. With respect to the single drive event, registered may be event information, course information, and music information.

As the event information, stored may be, without limitation, an event title, a date, a location, attributes of the fellow passenger, the vehicle model, and the purpose. In step S106 in FIG. 3, in the processing of storing the inputted setting, the CPU 2 may perform, in accordance with the user's input, the processing of storing the attributes of the fellow passenger, the vehicle model, or the purpose, or any combination thereof, in the event information.

As illustrated in FIG. 4B, the setting input screen such as the fellow passenger setting screen 51 may include a next button 104. The next button 104 causes the flow to proceed to the course design. In a case with the user's operation on the next button 104 detected, the CPU 2 may cause the flow to proceed from step S104 to step S110 in FIG. 3, to perform a display control of a course design screen 52 as illustrated in FIG. 6A.

Figure 6C:
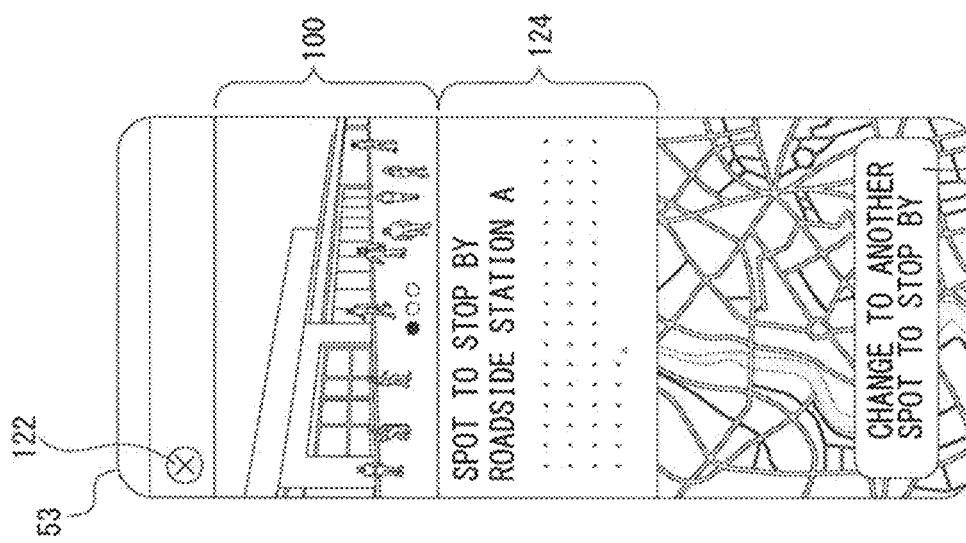
FIGS. 6A to 6C are diagrams of screen examples of the course design according to the first embodiment.
Figure 6B:
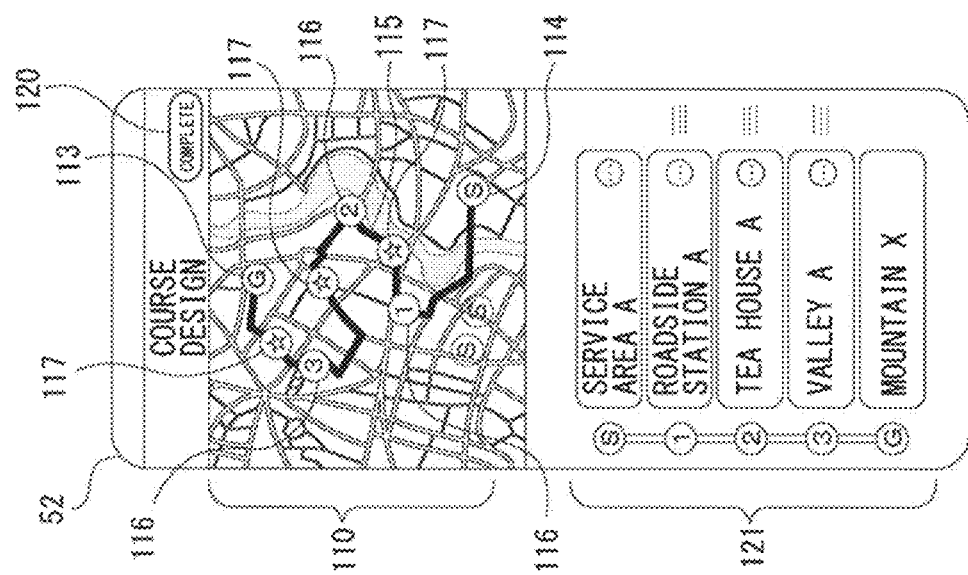
Figure 6A:
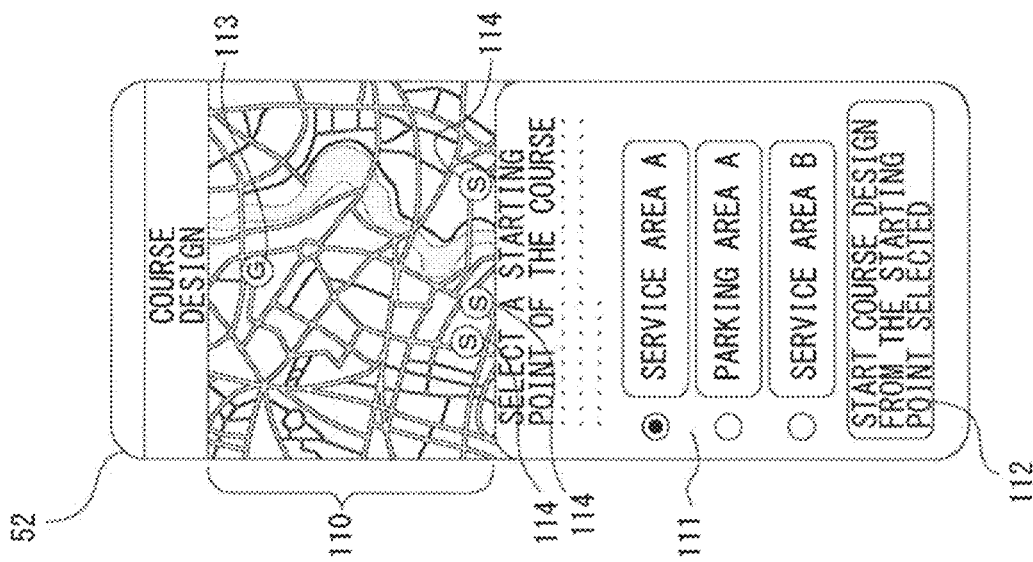

FIG. 6A illustrates a display example in a situation that the course design screen 52 requests the user to select the starting point.

A course display region 110 may provide map display, with a goal mark 113 indicating the goal point, i.e., the destination point. Moreover, a plurality of start marks 114 may indicate proposed starting points.

A starting point selection region 111 may be provided below the course display region 110. The starting point selection region 111 may include display of an instruction note and a list of options. For example, in this example, assume that the starting point selection region 111 may display the following list of options: "SA (abbreviation to a service area) A", PA (abbreviation to a parking area) A", and "SA B". These options may be indicated by the start marks 114 in the course display region 110. Moreover, the course design screen 52 may include a start button 112. The start button 112 may cause the course design to be started.

With the user's selection of the starting point from among "SA A", "PA A", and "SA B", and with the user's operation on the start button 112, the CPU 2 may cause the flow to proceed from step S111 to step S120 in FIG. 3, to perform course calculation.

In this way, the CPU 2 may calculate an appropriate course from the starting point to the goal point in accordance with the selection of the starting point. In this case, however, instead of simply calculating an efficient course from the starting point to the goal point, the CPU 2 may refer to the stop-by spot DB and the nice-moment place DB, and select the stop-by spot and/or the nice-moment place, to calculate the course including them. For example, the CPU 2 may calculate the course, with at least one or more stop-by spots added to the course.

In an alternative, the course design screen 52 may offer a list of proposed stop-by spots, to allow the user to make selection from the list.

Moreover, the CPU 2 may select the stop-by spot and/or the nice-moment place, in accordance with the setting inputted in step S103. For example, the CPU 2 may select the stop-by spot and/or the nice-moment place as appropriate in accordance with the fellow passenger, the purpose, and the vehicle model.

Accordingly, for example, the stop-by spot DB and the nice-moment place DB may have a score of affinity assigned to each via-point with respect to, for example, the fellow passenger, the purpose, and the vehicle type. The CPU 2 may make automatic selection in accordance with the score of affinity.

In step S121, the CPU 2 may provide provisional setting of the sound data. That is, the CPU 2 may perform automatic selection of the musical piece, i.e., processing of automatically setting the sound data, e.g., the musical piece, in accordance with the stop-by spot, the starting point, and the goal point included in the calculated course.

By the course calculation and the provisional setting of the sound data, the course information in the drive event #1 in FIG. 5 may be provisionally created. For example, assume that three stop-by spots SB #1, SB #2, and SB #3 and three nice-moment places NM #1, NM #2, and NM #3 are set between the starting point and the destination point, i.e., the goal point. In this case, the positional information regarding each of them may be stored, and the sound designation information corresponding to each of them may be stored. The "sound designation information" may include, for example, ID information attached to, for example, the musical piece, an album number, and/or a musical piece number.

The musical piece to be associated with the stop-by spot may be selected in accordance with registration of favorite music corresponding to a question item described later in accordance with features of the stop-by spot.

In step S122 in FIG. 3, the CPU 2 may perform a control of a course proposal. For example, as illustrated in FIG. 6B, the CPU 2 may allow a course line 115 to be displayed in the course display region 110 in the course design screen 52. The course line 115 may indicate a path from the start mark 114 to the goal mark 113. The CPU 2 may allow the selected stop-by spot to be indicated by the stop-by spot mark 116. The CPU 2 may allow the nice-moment place to be indicated by the nice-moment place mark 117.

Numerals may be attached to the respective stop-by spot marks 116. For example, the names of the stop-by spots may be displayed in the course detail region 121 in corresponding relation to the numerals in the course detail region 121. In this example, "roadside station A", "tea house A", and "valley A" are displayed as the stop-by spots. The nice-moment place mark 117 may take a different form from the stop-by spot mark 116. For example, the nice-moment place mark 117 may include depiction of a star shape.

Moreover, the course design screen 52 may provide pop-up display of a compete button 120 in response to the execution of the course calculation.

From the user's point of view, immediately after the selection of the starting point on the screen in FIG. 6A, display of the course as illustrated in FIG. 6B appears, thanks to the processing up to step S122 in FIG. 3. The course indicated by the course line 115 may include a plurality of routes through the several stop-by spots and the several nice-moment places.

In this state, the course design screen 52 may allow the user to operate the complete button 120 to terminate the course design, or to temporarily terminate the course design. Alternatively, the course design screen 52 may allow the user to continue, for example, to change the stop-by spot, or to designate the sound data to be associated with the nice-moment place.

Thus, in step S130, the CPU 2 may check on any operation regarding the stop-by spot. In step S140, the CPU 2 may check on any operation regarding the designation of the nice-moment place. In step S150, the CPU 2 may check on any operation regarding the completion.

For example, with the user's selection of one of the stop-by spots listed in the course detail region 121 or with the user's selection of one of the stop-by spot marks 116 in the course display region 110, the CPU 2 may cause the flow to proceed from step S130 to step S131 in FIG. 3. Thus, the CPU 2 may perform stop-by spot edition processing.

For example, in response to the user's selection of the stop-by spot, the CPU 2 may provide display of a stop-by spot detail screen 53 as illustrated in FIG. 6C. The stop-by spot detail screen 53 may include the image region 100 and the description region 124. The image region 100 is provided for display of an image of the stop-by spot. The description region 124 is provided for description of details of the stop-by spot. Hence, it is possible for the user to check on the stop-by spots set on the current course. The stop-by spot detail screen 53 may further include a close button 122 and a change button 125.

With the user's operation on the close button 122 without giving any instruction to change the stop-by spot, the CPU 2 may cause the flow to return from step S131 through step S132 to step S122. Thus, the CPU 2 may restore the course design screen 52 in FIG. 6B.

In a case with the user's operation on the change button 125 on the stop-by spot detail screen 53 detected, the CPU 2 may perform the following processing as edition of the stop-by spot in step S131.

First, the CPU 2 may provide display of a stop-by spot list screen 54 as illustrated in FIG. 7A. The stop-by spot list screen 54 may include a proposed list region 127. In the proposed list region 127, proposed stop-by spots near the course may be on display. The CPU 2 may refer to the stop-by spot DB, and extract other proposed stop-by spots near the currently set stop-by spots, to offer a new proposal. The proposed list region 127 may allow the user to select any one of the stop-by spots listed therein.

The stop-by spot list screen 54 may further include a cancel button 119. If any operation on the cancel button 119 detected, the CPU 2 may restore the display state as illustrated in FIG. 6C.

In a case with the user's operation to select one of the stop-by spots on the stop-by spot list screen 54, the CPU 2 may provide display of the stop-by spot detail screen 53, as illustrated in FIG. 7B, in which details of the selected stop-by spot are on display. In this example, details of "botanical garden A" are on display, in accordance with the user's selection of "botanical garden A" from the list.

In this case as well, the stop-by spot detail screen 53 may include the image region 100 and the description region 124. The image region 100 is provided for the display of the image of the stop-by spot. The description region 124 is provided for the description of the details. Thus, the stop-by spot detail screen 53 may allow the user to check on the details of the stop-by spot. The stop-by spot detail screen 53 may further include the close button 122. Moreover, in this case, the stop-by spot detail screen 53 may further include a designation button 128 instead of the change button 125 in FIG. 6C.

In a case with the user's operation on the close button 122, the CPU 2 may restore the stop-by spot list screen 54 in FIG. 7A.

In a case with the user's operation on the designation button 128, the CPU 2 may perform processing on an assumption that an instruction has been given to change the stop-by spot. In this case, the CPU 2 may cause the flow to proceed from step S132 to step S120, to change the stop-by spot, and thereafter, perform the course calculation. In step S121, the CPU 2 may perform the provisional setting of the sound data corresponding to the course change, i.e., the change in the stop-by spot. In step S122, the CPU 2 may offer the course proposal.

FIG. 7C illustrates an example of the proposed course in step S122. That is, the CPU 2 may provide display of the newly proposed course line 115 with a change in a position of the stop-by spot mark 116. There may be a case with a change in the nice-moment place, in accordance with the course change. As illustrated in the figure, in the course detail region 121, the first stop-by spot is changed to "botanical garden A". Moreover, in the processing of steps S120 and S121, the CPU 2 may also update the course information in FIG. 5.

The processing as described above allows the user to change the stop-by spot as the user likes it. It is to be understood that the processing as described above may allow the user to make edition to delete the stop-by spot.

Moreover, the course design screen 52 may allow the user to designate the musical piece with respect to the nice-moment place indicated on the course line 115.

FIG. 8A illustrates the same state of the course design screen 52 as illustrated in FIG. 7C. The course design screen 52 may allow the user to make an operation, e.g., tapping one of the nice-moment place marks 117 in the course display region 110, to designate a specific one of the nice-moment places.

In a case with such an operation detected, the CPU 2 may cause the flow to proceed from step S140 to step S141 in FIG. 3. Thus, the CPU 2 may perform a musical piece designation process as follows.

In response to the designation of the nice-moment place mark 117, as illustrated in FIG. 8B, the CPU 2 may perform a display control of a nice-moment place detail screen 55. The nice-moment place detail screen 55 may provide details of the designated nice-moment place. The nice-moment place detail screen 55 may include the image region 100 and the description region 124. The image region 100 is provided for display of an image of the nice-moment place. The description region 124 is provided for the details of the nice-moment place. Thus, the nice-moment place detail screen 55 may allow the user to check on the nice-moment place. The nice-moment place detail screen 55 may further include the close button 122 and an addition button 123. The addition button 123 may include an addition sign (+).

The nice-moment place detail screen 55 may further include a musical piece icon 105. The musical piece icon 105 may indicate the specific musical piece currently associated with the nice-moment place. In FIG. 8B, the musical piece icon 105 indicates a state in which no specific musical piece has not yet been associated with the nice-moment place.

With the user's operation on the close button 122 in FIG. 8B without making an operation to change the musical piece associated with the nice-moment place, the CPU 2 may restore the course design screen 52 in FIG. 8A.

In a case with the user's operation on the addition button 123 on the nice-moment place detail screen 55 detected, the CPU 2 may perform the following processing in step S141.

First, the CPU 2 may provide display of a musical piece selection screen 56 as illustrated in FIG. 8C. The musical piece selection screen 56 is provided for an input of conditions such as a name of an artist, a name of an album, a name of the musical piece, and a genre, to designate a specific musical piece. Although details of an operation of the designation are omitted, the musical piece selection screen 56 may allow the user to make an operation thereon to designate the specific musical piece.

The musical piece selection screen 56 may further include the cancel button 119. In a case with the user's operation on the cancel button 119 detected, the CPU 2 may restore the display state of the nice-moment place detail screen 55 in FIG. 8B.

In a case with the user's operation to designate a certain musical piece on the musical piece selection screen 56, the CPU 2 may perform, as illustrated in FIG. 8D, a presentation control of the designated musical piece on the nice-moment place detail screen 55.

That is, the CPU 2 may allow the musical piece icon 105 to provide display of an image associated with the designated musical piece. The CPU 2 may also allow a musical piece title 106 to provide display of the name of the musical piece and the name of the artist.

The CPU 2 may allow a release button 129 to be displayed in a case with the musical piece designated. The release button 129 may include a minus (−) sign. In a case with the user's operation on the release button 129, the CPU 2 may release the musical piece from the designation, and restore the display state in FIG. 8B.

In a case with the user's operation on the close button 122 detected, with the musical piece designated, the CPU 2 may determine that the musical piece has been designated, causing the flow to proceed from step S141 through step S142 to step S143 in FIG. 3. Thus, the CPU 2 may perform the provisional setting of the designated musical piece in the associated relation with the nice-moment place. That is, the CPU 2 may perform provisional setting of the sound designation information corresponding to the currently designated nice-moment place in the course information in FIG. 5. Thereafter, the CPU 2 may cause the flow to return to step S122, to provide the display of the course design screen 52 as illustrated in FIG. 8E.

In this case, the CPU 2 may change a display mode of the nice-moment place mark 117 as illustrated in the figure, to indicate that the designation of the musical piece has been made with respect to the nice-moment place. For example, the CPU 2 may provide color-coded display or blinking display of the nice-moment place mark 117.

As described above, it is possible for the user to designate the musical piece for each of the nice-moment places on the course. That is, it is possible for the user to designate the musical piece to playback at a place that is expected to give great experience to the user.

It is to be noted that the forgoing process may further include edition, e.g., adding, changing, or deleting the nice-moment place itself.

Moreover, for example, the musical piece to be associated with the nice-moment place may be automatically selected in step S121, and thereafter, subjected to the change by the user in the forgoing process.

For example, in a case with the user's operation detected on the complete button 120 on the course design screen 52 as illustrated in FIGS. 6B, 7C, and 8E, the CPU 2 may cause the flow in FIG. 3 to proceed from step S150 to step S151, to register the course and the designation of the sound data at the timing as valid. That is, the CPU 2 may cause the event information and the course information in FIG. 5 at the timing to be stored in, for example, the non-volatile memory unit 5 as registration information of one valid drive event. Thereafter, in step S152, the CPU 2 may terminate the course design, and cause a transition of screen display to the standby screen 57 described below.

Figure 9:
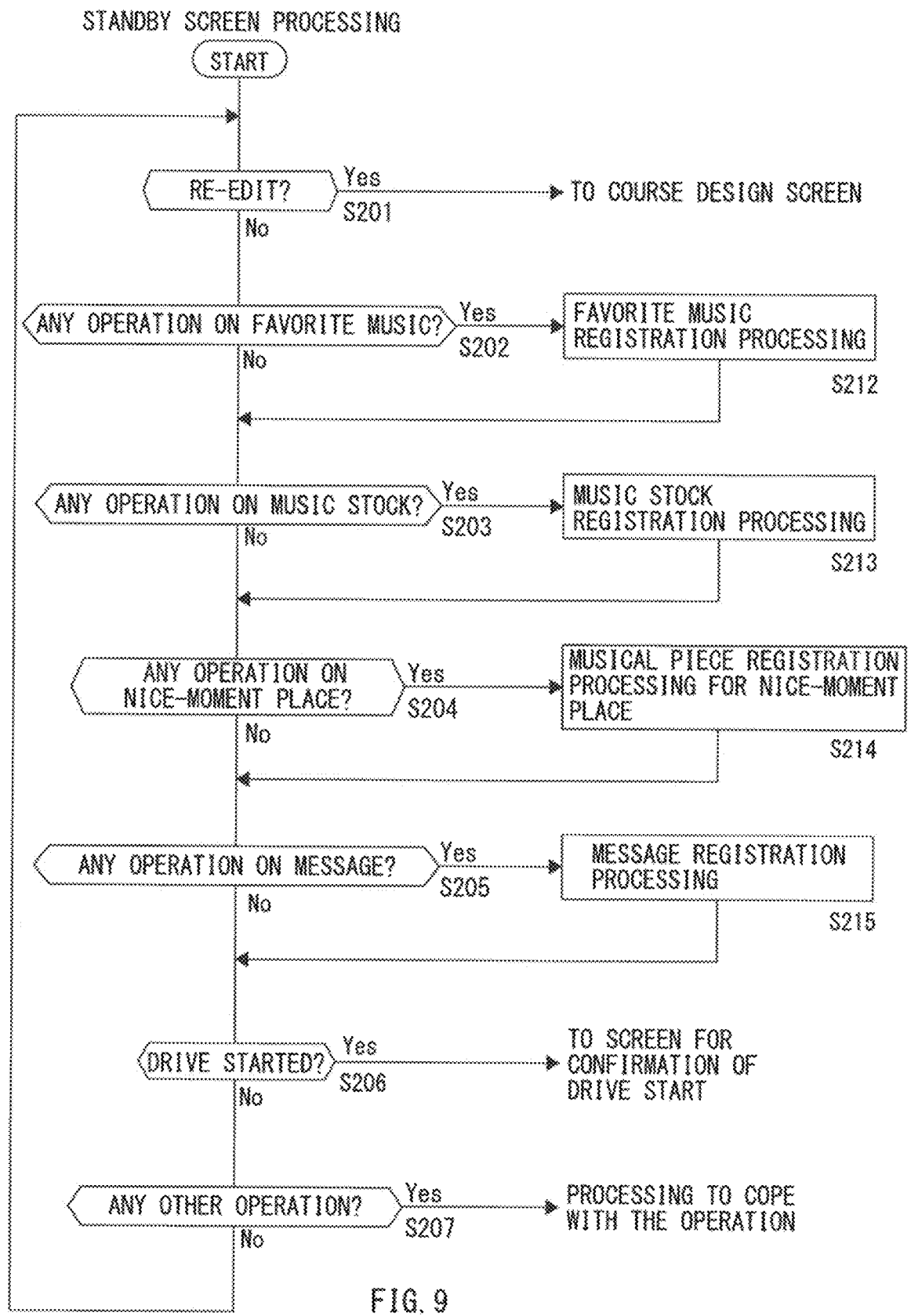
FIG. 9 is a flowchart of standby screen processing according to the first embodiment.
Figure 10:
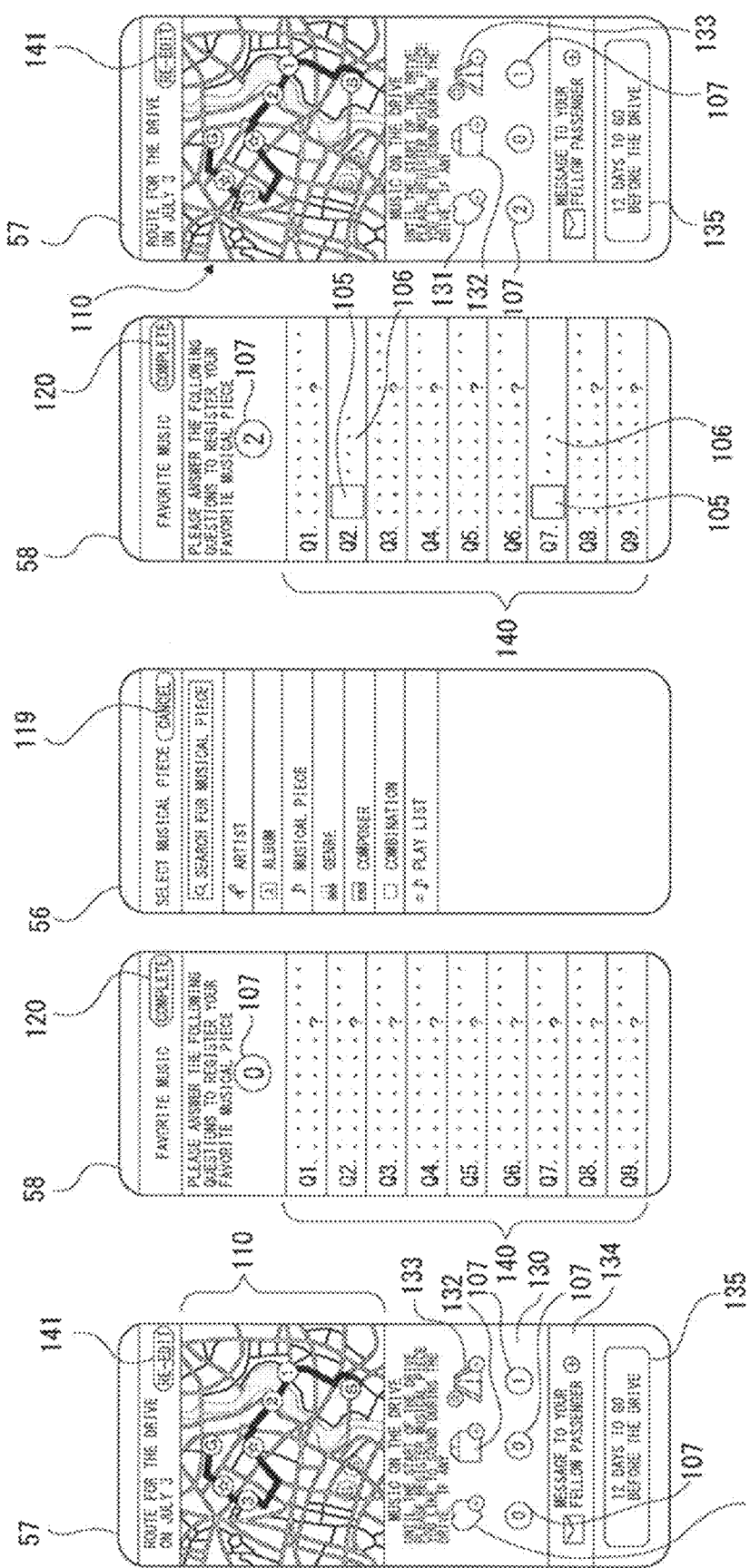
FIGS. 10A to 10E are diagrams of screen examples of favorite music registration according to the first embodiment.

FIG. 9 illustrates a processing example to be executed by the CPU 2 on a standby screen for a certain drive event. FIG. 10A illustrates an example of the standby screen 57.

The standby screen 57 may include the course display region 110 and a re-edit button 141. The course display region 110 may display the set course.

The standby screen 57 may further include an operation region 130 related to the drive event. In the operation region 130, arranged may be a favorite music operation unit 131, a music stock operation unit 132, and a nice-moment place music operation unit 133, each of which is accompanied by the number of the currently registered musical pieces 107.

The standby screen 57 may further include a message operation unit 134 and a guidance unit 135.

In the processing in FIG. 9, the CPU 2 may check on the user's operation on the standby screen 57.

In step S201, the CPU 2 may check on any operation on the re-edit button 141. If any operation on the re-edit button 141 detected, the CPU 2 may cause a transition to the course design screen 52 as described above, to execute the course design. For example, the CPU 2 may perform the processing from step S122 in FIG. 3. Alternatively, the CPU 2 may perform the processing from step S103 or from step S110 in FIG. 3.

This makes it possible for the user to change the contents of the drive event, i.e., the course, the route, the via-point, the designated musical piece, without limitation. In step S202 in FIG. 9, the CPU 2 may check on any operation on the favorite music. If any operation detected on the favorite music operation unit 131 on the standby screen 57 as illustrated in FIG. 10A, the CPU 2 may cause the flow to proceed to step S212, to perform favorite music registration processing as follows.

For example, the CPU 2 may display a favorite music registration screen 58 as illustrated FIG. 10B. The favorite music registration screen 58 may include the complete button 120, the number of the registered musical pieces 107, and a questionnaire region 140.

The questionnaire region 140 may provide display of several question items such as "Q1" and "Q2", to allow the user to designate the musical piece corresponding to the question. Non-limiting examples of the questions may include "What musical piece would you like to hear at a scenic place?" and "What musical piece would you like to hear on a mountain pass?". If any operation by the user tapping some question item, the CPU 2 may provide display of the musical piece selection screen 56 as illustrated in FIG. 10C. The musical piece selection screen 56 may allow the user to make an operation to select the musical piece corresponding to the contents of the question. The CPU 2 may perform processing of registering the selected musical piece as the favorite music corresponding to the question item. For example, the CPU 2 may register the sound designation information corresponding to the question items "Q1", "Q2", ..., and "Qn", as the music information in FIG. 5.

FIG. 10D illustrates a display state of the favorite music registration screen 58 after the user's designation of the musical piece for the question items Q2 and Q7, for example. The favorite music registration screen 58 may provide display of, for example, the musical piece icon 105 and the musical piece title 106 of the musical piece designated for the question items Q2 and Q7. Moreover, the favorite music registration screen 58 may provide display of "2" for the number of the registered musical pieces 107.

In step S212 in the favorite music registration processing, the CPU 2 may perform a control of registration and display of the musical piece corresponding to the question item in accordance with the designation of the musical piece as described above. If any operation on the complete button 120 on the favorite music registration screen 58, the CPU 2 may restore the standby screen 57 in FIG. 10E. In a case with two musical pieces registered as described above, the standby screen 57 may provide display of "2" for the number of the registered musical pieces 107 corresponding to the favorite music operation unit 131.

Such favorite music registration makes it possible for the CPU 2 to select the musical piece to be associated with the stop-by spot in, for example, step S121 in FIG. 3 as described above. For example, assume that a certain stop-by spot has attribute information that the stop-by spot is a scenic place. In this case, it is possible to associate, with the stop-by spot, the musical piece selected by the user with respect to the question item "What musical piece would you like to hear at a scenic place?". Thus, on arrival at the relevant via-point on an actual drive, it is possible to playback the musical piece user likes to hear and suitable for the relevant via-point.

In step S203 in FIG. 9, the CPU 2 may check on any operation on the music stock. If any operation detected on the music stock operation unit 132 on the standby screen 57 in FIG. 11A, the CPU 2 may perform, in step S213, music stock registration processing as follows.

Figure 11:
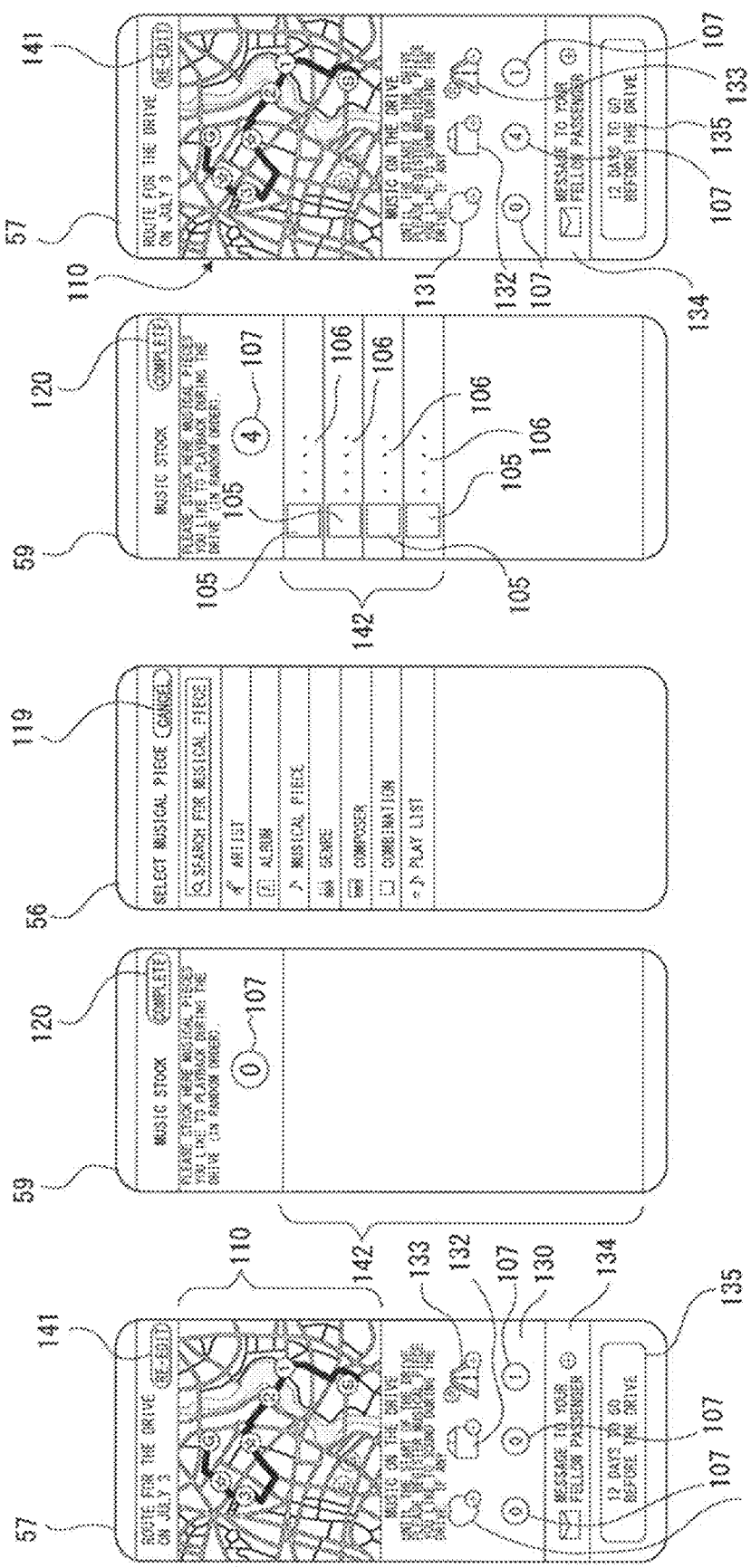
FIGS. 11A to 11E are diagrams of screen examples of music stock registration according to the first embodiment.

For example, the CPU 2 may provide display of a music stock registration screen 59 as illustrated in FIG. 11B. The music stock registration screen 59 may include the complete button 120, the number of the registered musical pieces 107, and a stock region 142.

The stock region 142 may be initially blank. The stock region 142 is provided for display of the musical piece to playback during the drive in the relevant drive event.

In a case with the user's operation on the stock region 142, e.g., tapping, the CPU 2 may provide display of the musical piece selection screen 56 as illustrated in FIG. 11C. The musical piece selection screen 56 may allow the user to make an operation to designate the musical piece to stock. The CPU 2 may perform processing of registering the designated musical piece as the music stock, that is, the musical piece to playback during the drive. For example, the CPU 2 may register the designated sound information, as the music information in FIG. 5, in a storage region of the music stock.

FIG. 11D illustrates a display state of the music stock registration screen 59 after the user's designation of, for example, four musical pieces. In the stock region 142, displayed may be, for example, the musical piece icon 105 and the musical piece title 106 of each musical piece. The music stock registration screen 59 may also display of "4" for the number of the registered musical pieces.

In step S213 in the music stock registration processing, the CPU 2 may perform a control of the registration and the display of the music stock in accordance with the designation of the musical piece as described above. Thereafter, if any operation on the complete button 120 on the music stock registration screen 59, the CPU 2 may restore the standby screen 57 in FIG. 11E. In a case with the four musical pieces registered as described above, the standby screen 57 may provide display of "4" for the number of the registered musical pieces 107 corresponding to the music stock operation unit 132.

In step S204 in FIG. 9, the CPU 2 may check on any operation on the nice-moment place music. If any operation detected on the nice-moment place music operation unit 133 on the standby screen 57 in FIG. 12A, the CPU 2 may cause the flow to proceed to step S214, to perform musical piece registration processing for the nice-moment place.

Figure 12:
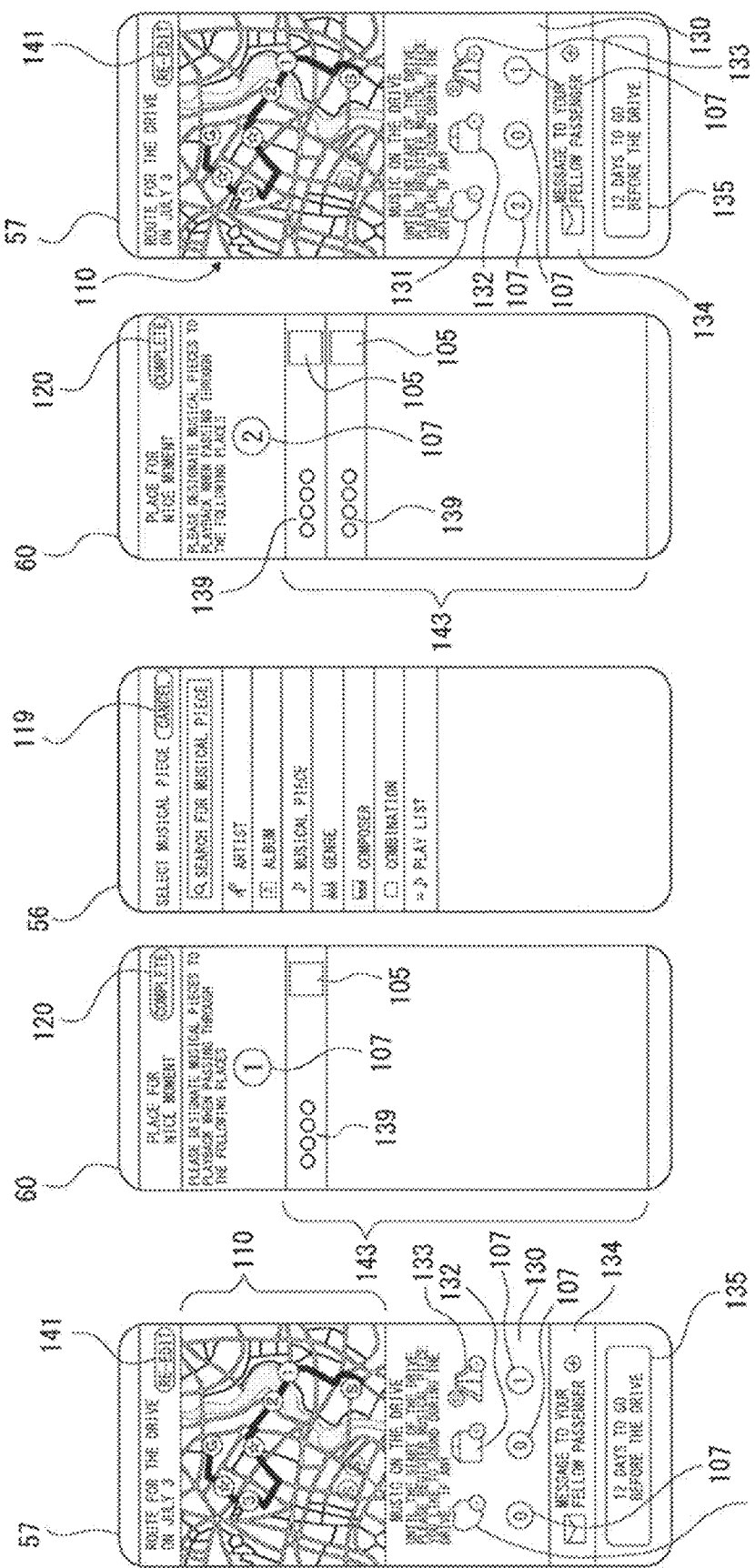
FIGS. 12A to 12E are diagrams of screen examples of the registration of the musical piece for the nice-moment place according to the first embodiment.

For example, the CPU 2 may provide display of a nice-moment place music list screen 60 as illustrated in FIG. 12B. The nice-moment place music list screen 60 may include the complete button 120, the number of the registered musical pieces 107, and a music list region 143.

The music list region 143 may provide display of the musical piece registered for each of the nice-moment places, by a combination of, for example, a name of the nice-moment place 139 and the musical piece icon 105. The name of the nice-moment place 139 may indicate the nice-moment place.

In a case with the user's operation on the music list region 143, e.g., tapping, the CPU 2 may provide display of the musical piece selection screen 56 as illustrated in FIG. 12C. The musical piece selection screen 56 may allow the user to make an operation to designate the musical piece to be associated with the nice-moment place. The CPU 2 may perform processing of registering the designated musical piece in associated relation with the nice-moment place. For example, the CPU 2 may register the designated sound information corresponding to the nice-moment place, as the course information in FIG. 5.

FIG. 12D illustrates a display state of the nice-moment place music list screen 60 after, for example, two musical pieces are associated with the nice-moment place. The music list region 143 may provide display of the two combinations of the name of the nice-moment place 139 and the musical piece icon 105. The nice-moment place music list screen 60 may also provide display of "2" for the number of the registered musical pieces 107.

In step S214, the CPU 2 may perform a control of the registration and the display of the musical piece corresponding to the nice-moment place in accordance with the designation of the musical piece as described above. Thereafter, if any operation on the complete button 120 on the nice-moment place music list screen 60, the CPU 2 may restore the standby screen 57 in FIG. 12E. With the two musical pieces registered as described above, the standby screen 57 may provide display of "2" for the number of the registered musical pieces 107 corresponding to the nice-moment place music operation unit 133.

In step S205 in FIG. 9, the CPU 2 may check on any operation on the message. If any operation detected on the message operation unit 134 on the standby screen 57 in FIG. 13A, the CPU 2 may cause the flow to proceed to step S215, to perform processing of recording a message.

Figure 13:
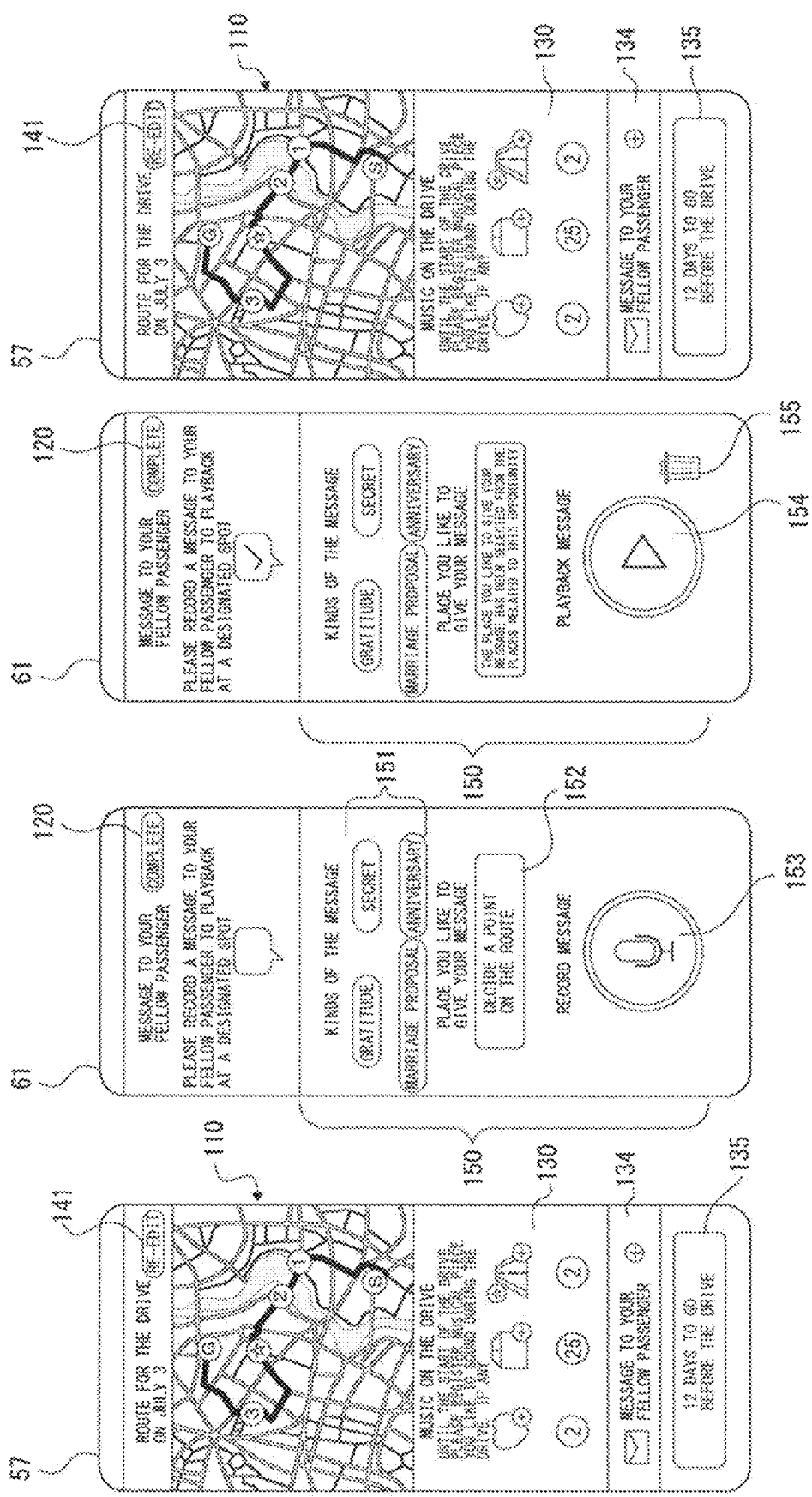
FIGS. 13A to 13D are diagrams of screen examples of message registration according to the first embodiment.

For example, the CPU 2 may provide display of a message registration screen 61 as illustrated in FIG. 13B.

The message registration screen 61 may include the complete button 120 and a message operation region 150. The message operation region 150 may include, for example, a kind button 151, a place designation button 152, and a record button 153. The kind button 151 is provided for designation of a kind of a message. The place designation button 152 is provided for designation of a place to playback the message.

The message operation region 150 may allow the user to designate the kind of the message and the place for the message. The message operation region 150 may also allow the user to operate the record button 153 and to make utterance to record the message. In response to these operations, the CPU 2 may perform processing of recording the audio data. The CPU 2 may also register the designated sound information indicating the audio message, as the course information illustrated in FIG. 5, in accordance with the designated place such as the stop-by spot and the nice-moment place.

FIG. 13C illustrates a display state of the message registration screen 61 after the message recording is performed. The record button 153 may be replaced by a playback button 154. A trash box icon 155 may be additionally on display. In a case with the user's operation on the playback button 154 detected, the CPU 2 may cause the recorded audio message to be played back. In a case with the user's operation on the trash box icon 155 detected, the CPU 2 may cause deletion of the recorded audio message and restore the display state as illustrated in FIG. 13B. This allows the user to record the message, to playback the message, to delete the message, and to record a new message.

In step S215, in response to the operations regarding the message recording as described above, the CPU 2 may perform, for example, a control of the audio recording, the playback, the deletion, the registration in accordance with the place, and the display of the message. If any operation on the complete button 120 on the message registration screen 61, the CPU 2 may restore the standby screen 57 as illustrated in FIG. 13D.

In step S206 in FIG. 9, the CPU 2 may check on any operation on a start of the drive. In a case where a drive start operation described below is made, the CPU 2 may provide display of a drive start confirmation screen described below. Thereafter, the CPU 2 may execute on-the-drive processing as illustrated in FIG. 14.

In step S207 in FIG. 9, the CPU 2 may check on any other operation than the operations as described above. Non-limiting examples may include an operation to make a screen transition and an operation to terminate the processing. If any operation detected, the CPU 2 may perform processing as necessary in response thereto.

Figure 14:
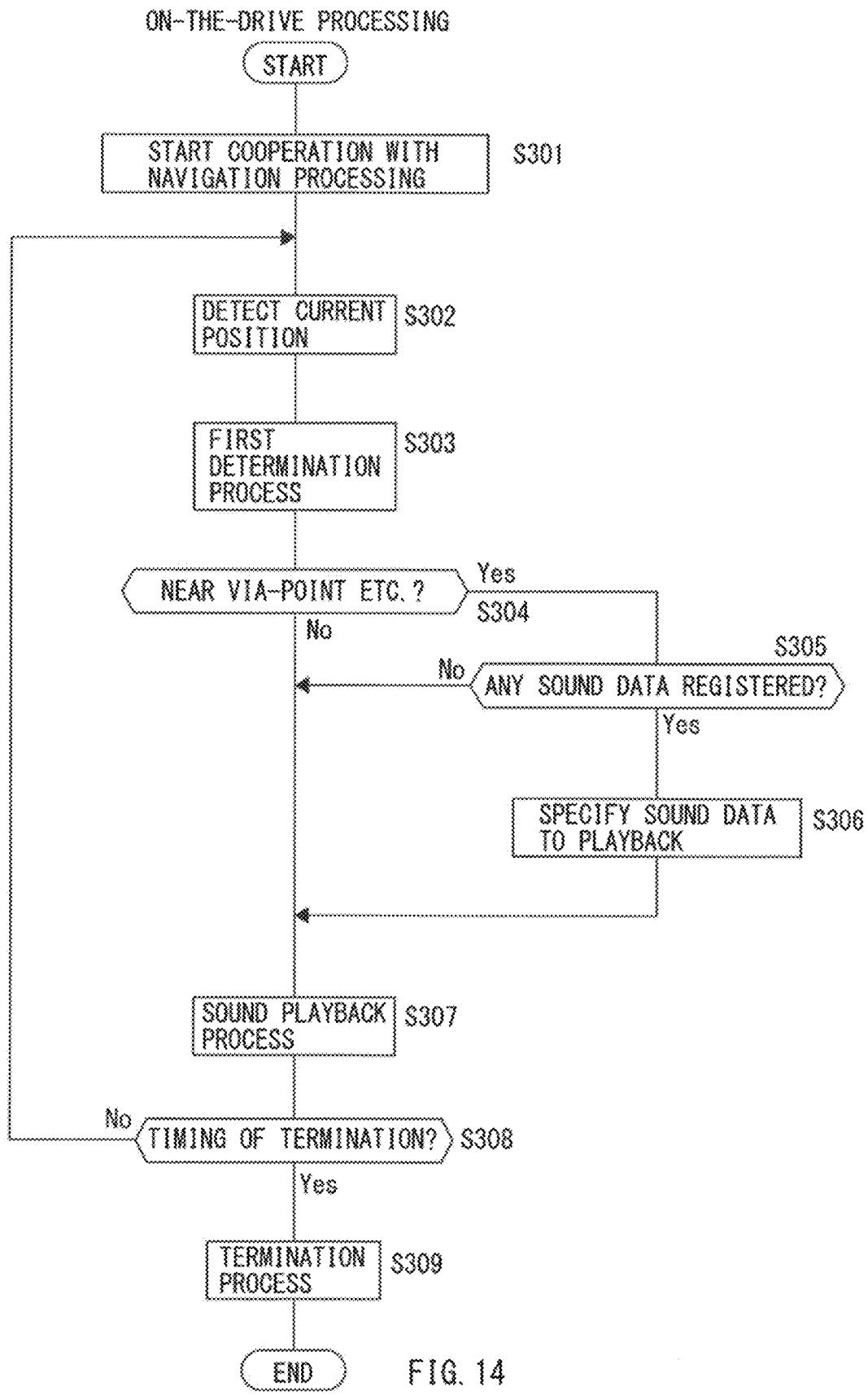
FIG. 14 is a flowchart of on-the-drive processing according to the first embodiment.

Described next, with reference to FIG. 14, is a processing example to be executed by the CPU 2 after the start of the drive. FIGS. 15A to 15E illustrate screen transitions.

Figure 15:
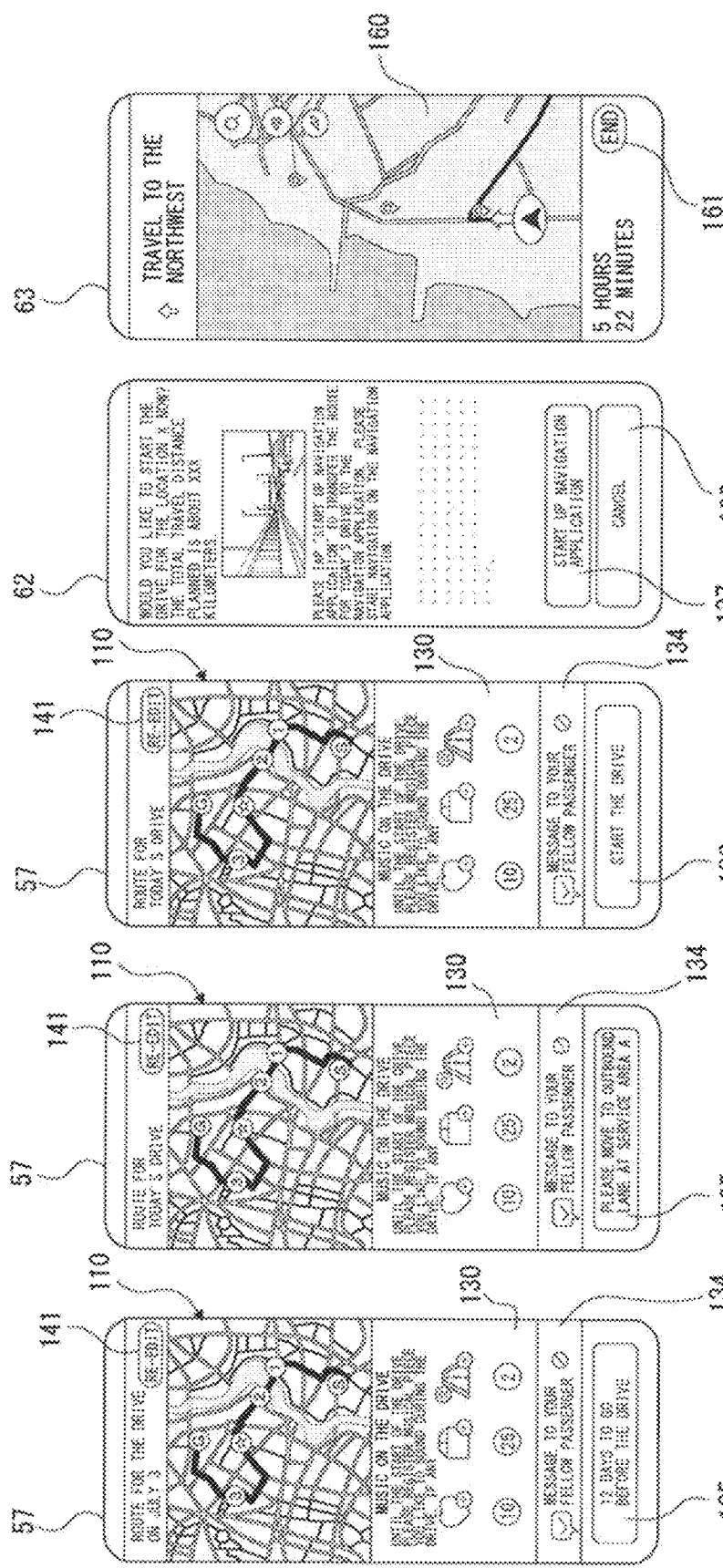
FIGS. 15A to 15E are diagrams of screen examples at a start of the drive according to the first embodiment.

FIG. 15A illustrates the standby screen 57 that allows the user to execute the designation of, for example, the route or the musical piece as the user likes it, as described above. On the date of the drive event, as illustrated in FIG. 15B, the guidance unit 135 may provide display of an instruction to move to the starting point, e.g., the service area A. The user moves to the starting point, following the instruction.

On arrival at the starting point, a drive start button 136 may be displayed in place of the guidance unit 135. In response to the user's operation on the drive start button 136, the CPU 2 may provide display of the drive start confirmation screen 62 as illustrated in FIG. 15D.

The drive start confirmation screen 62 may include an open button 137 and a cancel button 138. With an operation on the cancel button 138 made, the CPU 2 may restore the standby screen 57 in FIG. 15C. The open button 137 may be an operator provided for a start of cooperation with an application for navigation. In response to the user's operation on the open button 137, the CPU 2 may start the cooperation with navigation processing, as illustrated in step S301 in FIG. 14. The CPU 2 may provide display of a navigation image 160 as illustrated in FIG. 15E to present a position of an own vehicle on a map. Thus, the CPU 2 may start the route guidance in accordance with the course set as the drive event on this occasion.

Thereafter, the CPU 2 may perform processing of step S302 and subsequent steps in FIG. 14, in parallel with the route guidance processing.

In step S302, the CPU2 may periodically detect the current position.

In step S303, the CPU 2 may perform a first determination process. This is a process of comparing the current position with the positional information of the starting point, the via-point such as the stop-by spot and the nice-moment place, or the destination point in the course information in FIG. 5, to determine whether or not the current position is close to the starting point, the via-point, or the destination point. In other words, the first determination process includes determining whether or not a spacing distance between the current position and the starting point, the via-point, or the destination point is within a predetermined range. Hereinbelow the starting point, the via-point, or the destination point are also referred to as "via-point, etc.".

In a case where the current position is not in the vicinity of the via-point, etc., the CPU 2 may cause the flow to proceed from step S304 to step S307, to perform a sound playback process. In this case, the CPU 2 may playback the musical piece selected from among those registered as the music stock, instead of the musical piece associated with the via-point, etc.

In a case where the current position is in the vicinity of the via-point, etc., the CPU 2 may cause the flow to proceed from step S304 to step S305, to check on presence or absence of the sound data registered for the via-point, etc. In other words, the CPU 2 may check on the course information in FIG. 5 to determine whether or not the sound designation information is registered with respect to the via-point, etc. to which the current position is assumed to be close. In a case with the absence of the sound data registered, the CPU 2 may cause the flow to proceed to step S307.

In a case with the presence of the sound data registered with respect to the via-point, etc. to which the current position is assumed to be close, the CPU 2 may cause the flow to proceed to step S306, to specify the sound data to playback. Thereafter, the CPU 2 may cause the flow to proceed to step S307, to perform a playback control of the specified sound data.

In this case, the sound data to be specified may be, for example, the musical piece indicated by the sound designation information. The sound designation information may be information that designates, for example, the musical piece registered by the user in the associated relation with the nice-moment place, and the musical piece automatically selected in accordance with, for example, the stop-by spot, the fellow passenger, the vehicle type, and the purpose.

There may be a case where, for example, a plurality of the musical pieces is registered by a plurality of pieces of the sound designation information with respect to the single via-point, etc. In this case, the CPU 2 may specify the musical piece having high affinity in accordance with, for example, the fellow passenger, the vehicle model, and the purpose, among, for example, the plurality of the musical pieces.

The playback control in step S307 may include, for example, playing back the musical piece specified on this occasion, after an end of the musical piece that has been played back. Alternatively, the playback control in step S307 may include, for example, bringing the playback of the musical piece to an end, e.g., a fade out, and starting the playback of the musical piece specified on this occasion.

For example, assume that a musical piece MPA is registered for the nice-moment place NM #1. In this case, approaching the nice-moment place NM #1 may cause a start of playback of the musical piece MPA.

Assume that an audio message is registered for the stop-by spot SB #2. In this case, the audio message may be played back at timing as approaches the stop-by spot SB #2.

Even if the user does not designate any musical piece, in a case where the nice-moment place NM #3 is a scenic place, approaching the nice-moment place NM #3 may cause a start of playback of a musical piece MPB registered as the favorite music in answering the question "What musical piece would you like to hear at a scenic place?".

The CPU 2 may repeat the processing from step S302 to step S307 until a determination of timing of termination is made in step S308.

The CPU 2 may make the determination of the timing of the termination, in a case where the route guidance is ended on the arrival at the destination point, or in a case with an operation on an end button 161 on the navigation screen 63 in FIG. 15E.

In the case with the determination of the timing of the termination, the CPU 2 may cause the flow to proceed to step S309. In step S309, the CPU 2 may perform a termination process to finish a series of processes.

Processing of Second Embodiment

The second embodiment is an example that includes not only playing back the music or the message in accordance with the via-point, etc., but also setting a character such as a DJ, to playback the music or the message together with a talk of the character like an original radio program.

Figure 16:
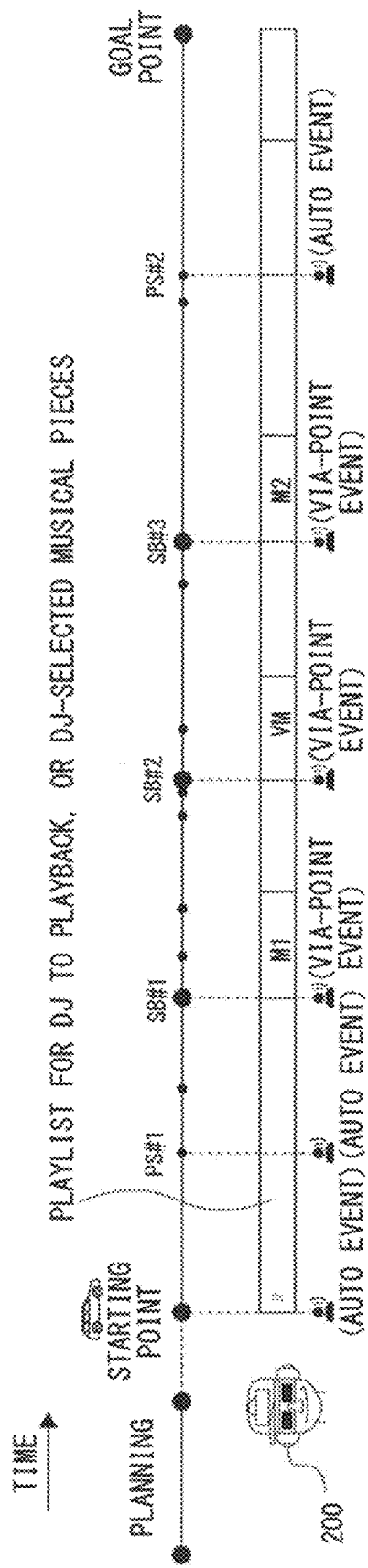
FIG. 16 is a diagram of a sound output according to a second embodiment.

FIG. 16 graphically illustrates an example of the playback in time series. An initial planning period may indicate a period during which the drive event is set as described above.

In this example, the starting point may be followed by specific points PS #1 and PS #2, the stop-by spots SB #1, SB #2, and SB #3, and the goal point.

For example, at the starting point and the points PS #1 and PS #2, sound playback as an auto event may be performed.

For example, at and after timing of the arrival at the starting point, music playback together with a talk of a character 200 may be performed as the auto event. For example, at the starting point, the character 200 may give an opening talk, introduce a musical piece, and playback the musical piece.

On arrival at the vicinity of the point PS #1 or the point PS #2, the character 200 may give a talk about tourist information and/or playback a specific musical piece.

In the vicinity of the stop-by spot SB #1, a musical piece M1 associated with the stop-by spot SB #1 may be played back as a via-point event. In the vicinity of the stop-by spot SB #2, an audio message VM associated with the stop-by spot SB #2 may be played back as the via-point event. In the vicinity of the stop-by spot SB #3, a musical piece M2 associated with the stop-by spot SB #3 may be played back as the via-point event. For these via-point events as well, for example, an introduction talk by the character 200 may also be played back.

It is understood that the via point events may be also performed in association with the nice-moment places.

The image of the character 200, e.g., a moving image or a still image, may be displayed on the display unit 7 of the information processor 1, in superimposed relation to the navigation image 160 as illustrated in, for example, FIG. 15E.

In this way, the musical pieces may be played back as if the DJ selected them, with an output of the talk suitable for the place. In the course, as described in the first embodiment, the musical piece, the message, without limitation, associated with the via-point by the user's operation or the automatic music selection is also played back at timing of the arrival at the vicinity of the relevant via-point.

The registration of the musical piece, the message, without limitation, associated with the via-point may be similar to that of the first embodiment. Refer to FIG. 5.

The contents of the talk and the image of the character 200 may be registered in association with the output condition, as illustrated in FIG. 17.

For example, the output condition may be "being at the starting point", "having crossed a prefectural border", "having reached a specific point", or "coming close to the registered via-point". In addition, the output condition may take a temporal factor into consideration.

The talk of the character 200 may include various patterns of the voice data and the image data of the character 200. The various patterns of the voice data and the image data of the character 200 may be prepared in advance and registered as character voice designation information and character image designation information, with respect to the output conditions.

In other words, various kinds of the voice data of the character 200 and various kinds of the image data, e.g., the moving image, of the character 200 may be held separately in the non-volatile memory unit 5. The voice data and the image data to be played back may be specified in accordance with the output condition, by the character voice designation information and the character image designation information.

Thus, FIG. 17 summarizes a table of data set and registered as to which voice and which image of the character to output in accordance with the output condition.

The information as summarized in FIG. 17 may be set by the user, or alternatively, the information as summarized in FIG. 17 may be provided by a manufacturer of the application program.

Figure 18:
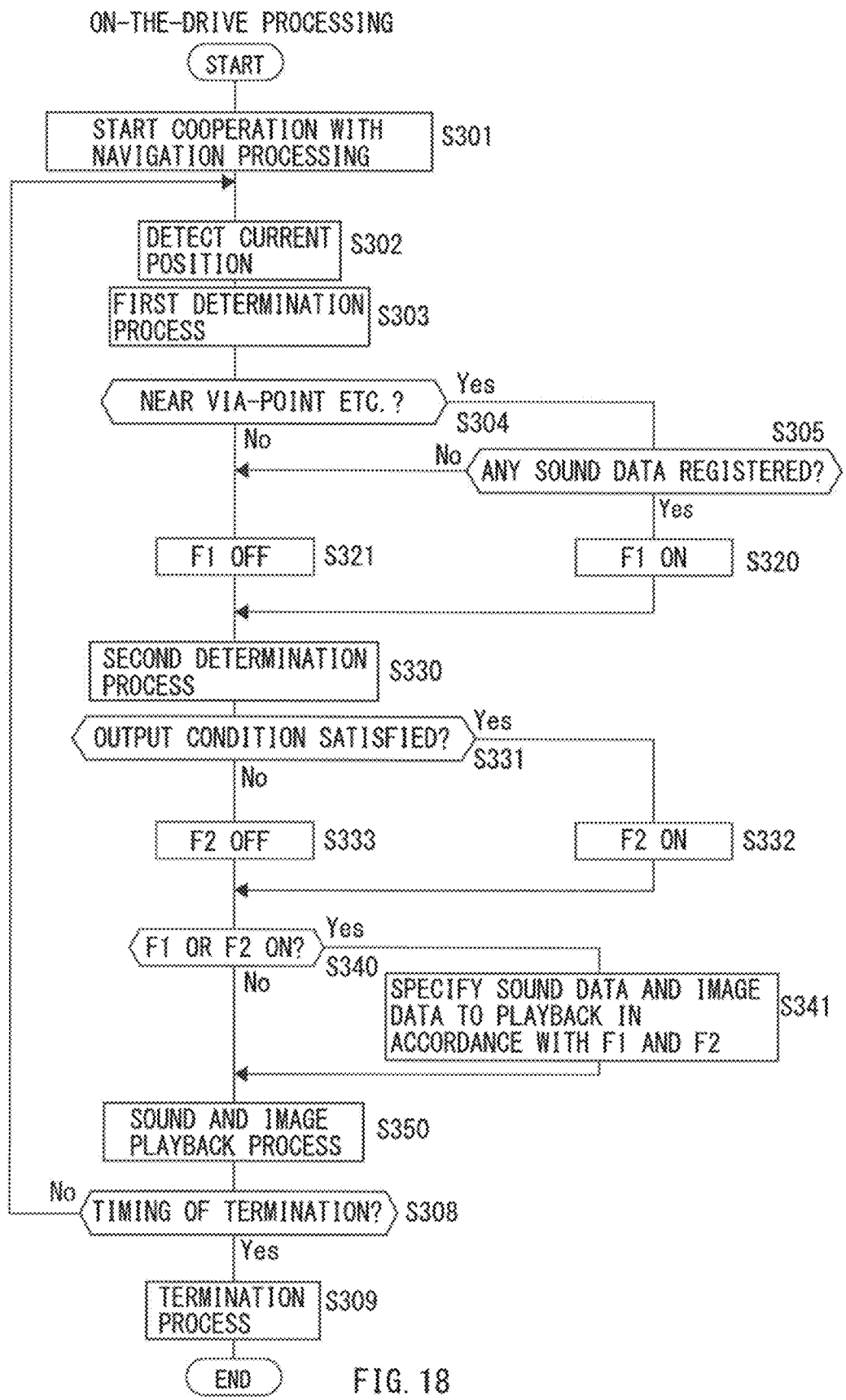
FIG. 18 is a flowchart of on-the-drive processing according to the second embodiment.

FIG. 18 illustrates on-the-drive processing by the CPU 2 according to the second embodiment. In FIG. 18, similar processes to those of FIG. 14 are denoted by the same step numerals, and detailed description thereof is omitted.

In step S301 in FIG. 18, the cooperation with the navigation processing may be started. Thereafter, in step S302, the CPU 2 may detect the current position. In step S303, the CPU 2 may perform the first determination process as described above.

In the first determination process, in the case with the determination that the current position is in the vicinity of the via-point, etc., i.e., the starting point, the stop-by spot, the nice-moment place, or the destination point, with the sound data registered with respect to the via-point, etc., i.e., with the sound designation information registered, the CPU 2 may cause the flow to proceed to step S320, to turn on the flag F1.

Meanwhile, in the first determination process, in the case with the determination that the current position is not in the vicinity of the via-point, etc., or in a case where the current position is in the vicinity of the via-point, etc., but the sound data is not registered, the CPU 2 may cause the flow to proceed to step S321, to turn off the flag F1. The flag F1 may be a flag indicating whether or not it is timing to perform the via-point event.

In step S330, the CPU 2 may perform a second determination process. The second determination process may include determining whether or not any of the output conditions summarized in FIG. 17 is satisfied.

In a case with a determination that one of the output conditions is satisfied, the CPU 2 may cause the flow to step S332, to turn on the flag F2. In a case with a determination that the output conditions are not satisfied, the CPU 2 may cause the flow to step S333, to turn off the flag F2. The flag F2 may be a flag indicating whether or not it is timing to output a talk sound or the image of the character 200 as the auto event or the via-point event.

In step S340, the CPU2 may check on the flags F1 and F2. In a case where the flags F1 and F2 are both turned off, the CPU 2 may cause the flow to proceed to step S350, to perform a sound and image playback process. For example, the CPU 2 may playback the musical piece selected from among those registered as the music stock, rather than the musical piece associated with the via-point, etc. The CPU 2 does not bother to perform a playback and display control of the image of the character.

In a case where either the flag F1 or the flag F2 is turned on, the CPU 2 may cause the flow to proceed to step S341, to specify the sound data and the image data to playback. For example, in a case where solely the flag F2 is turned on, the CPU 2 may specify the talk sound of the character 200 to output as the auto event. In this case, in the sound and image playback process in step S350, the CPU 2 may playback the specified talk sound. Thereafter, the CPU 2 may playback the musical piece randomly selected from among the musical pieces registered as the music stock.

For example, in a case where solely the flag F1 is turned on, the CPU 2 may specify, for example, as with the first embodiment, the musical piece associated with the nice-moment place or the stop-by spot, or the musical piece registered as favorite music. Thereafter, in step S350, the CPU 2 may playback the specified musical piece.

In a case where the flags F1 and F2 are both turned on, the CPU 2 may specify the talk sound of the character 200, and specify the musical piece registered in the associated relation with the via-point, etc. Thereafter, in step S350, the CPU 2 may playback the specified musical piece, following the specified talk sound of the character 200.

In a case where the flag F2 is turned on, with the image data of the character corresponding to the output condition registered, the CPU 2 may specify the image data in step S341. Thereafter, in step S350, the CPU 2 may perform a display control of the image of the character 200, e.g., the moving image, with accompaniment of the talk sound of the character 200.

In the table of data in FIG. 17, the character image designation information may be registered with respect to the output conditions, while the character voice designation information is not registered. In such cases, in step S341, the CPU 2 may specify the image data, to display and output the image of the character and to playback the musical piece of the normal music stock, without playing back the voice of the character.

The CPU 2 may repeat the processing from step S302 to step S350 as described above, until the determination of the timing of the termination is made in step S308. In the case with the determination of the timing of the termination, the CPU 2 may perform the termination process in step S309 to finish a series of processes.

Thus, the sound and image playback as illustrated in, for example, in FIG. 16 may be realized.

CONCLUSION AND MODIFICATION EXAMPLES

According to the forgoing embodiments, it is possible to produce the following effects.

The information processor 1 according to the example embodiment includes the acquisition unit 21, the course setting unit 22, the registration unit 24, the detection unit 26, the first determination unit 27, and the controller 29. The acquisition unit 21 is configured to acquire the information regarding the via-point. The course setting unit 22 is configured to set the course from the starting point to the destination point through the via-point in the singularity or in the plurality. The registration unit 24 is configured to perform processing of associating the sound data with the via-point set on the course, to register the sound data in a storage medium. The detection unit 26 is configured to detect the current position. The first determination unit 27 is configured to determine whether or not the current position detected by the detection unit 26 is within the predetermined range from the via-point. The controller 29 is configured to make the output control of the sound data registered in the storage medium, in according with the determination result by the first determination unit 27.

This makes it possible to playback, for example, the musical piece that matches the mood when passing through the vicinity of the stop-by spot or the nice-moment place. Hence, it is possible to entertain occupants with a special staging effect during the drive.

It is to be noted that the sound data is not limited to the musical piece and the audio message but may be, for example, an audio announcement and the sound effects.

In the information processor 1 according to the example embodiments, the acquisition unit 21 may further acquire the information regarding the attributes of the fellow passenger. The controller 29 may make the output control of the sound data in accordance with the determination result by the first determination unit 27 and the attributes of the fellow passenger acquired by the acquisition unit 21.

For example, in step S121 in FIG. 3, whichever sound data corresponding to the via-point, e.g., the stop-by spot and the nice-moment place accords with the attributes of the fellow passenger may be registered. In step S306 in FIG. 14, the sound data thus registered may be designated. In step S307, the output control may be performed. This leads to the output control of the sound data in accordance with the result of the first determination process and the attributes of the fellow passenger.

In one alternative, for example, in step S121 in FIG. 3, a plurality of pieces of the sound data corresponding to the via-point may be registered. In step S306 in FIG. 14, whichever sound data registered is selected in accordance with the attributes of the fellow passenger may be designated. In step S307, the output control may be performed. This leads to the output control of the sound data in accordance with the result of the first determination process and the attributes of the fellow passenger.

In this way, it is possible to provide a sound staging effect corresponding to the attributes of the fellow passenger. For example, it is possible to playback a suitable musical piece at a suitable place, in accordance with, for example, whether the drive is with family members, whether the drive is with friends, or whether the drive is with a partner.

According to the example embodiment, the acquisition unit 21 may further acquire information regarding an operation purpose. The controller 29 makes the output control of the sound data on the basis of the determination result by the first determination unit 27 and the operation purpose acquired by the acquisition unit 21.

For example, in step S121 in FIG. 3, whichever sound data corresponding to the via-point, e.g., the stop-by spot and the nice-moment place, accords with the operation purpose may be registered. In step S306 in FIG. 14, the sound data thus registered may be designated. In step S307, the output control may be performed. This leads to the output control of the sound data in accordance with the result of the first determination process and the operation purpose.

In one alternative, for example, in step S121 in FIG. 3, a plurality of pieces of the sound data corresponding to the via-point may be registered. In step S306 in FIG. 14, whichever sound data registered is selected in accordance with the operation purpose may be designated. In step S307, the output control may be performed. This leads to the output control of the sound data in accordance with the result of the first determination process and the operation purpose.

In this way, it is possible to provide a sound staging effect corresponding to the operation purpose. For example, it is possible to playback a musical piece suitable for the purpose such as usual sightseeing, a marriage proposal, a birthday celebration at a suitable place.

The output control of the sound data may be performed in accordance with both the attributes of the fellow passenger and the operation purpose.

For example, in step S121 in FIG. 3, whichever sound data corresponding to the via-point, e.g., the stop-by spot and the nice-moment place, accords with the attributes of the fellow passenger and the operation purpose may be registered. In step S306 in FIG. 14, the sound data thus registered may be designated. In step S307, the output control may be performed. This leads to the output control of the sound data in accordance with the result of the first determination process, the attributes of the fellow passenger, and the operation purpose.

In one alternative, for example, in step S121 in FIG. 3, a plurality of pieces of the sound data corresponding to the via-point may be registered. In step S306 in FIG. 14, whichever sound data registered is selected in accordance with the attributes of the fellow passenger and the operation purpose may be designated. In step S307, the output control may be performed. This leads to the output control of the sound data in accordance with the result of the first determination process, the attributes of the fellow passenger, and the operation purpose.

In this way, it is possible to provide a sound staging effect corresponding to the attributes of the fellow passenger and the operation purpose. For example, it is possible to playback a musical piece suitable for the purpose such as usual sightseeing, a marriage proposal, a birthday celebration at a suitable place, in accordance with, for example, whether the drive is with family members, whether the drive is with friends, or whether the drive is with a partner.

According to the example embodiment, the via-point may include a location, a road, or both that are registered in a via-point DB with the purpose of passing through, e.g., the nice-moment place.

The nice-moment place may be set as a road, a location, or both that give a driver and/or the fellow passenger great experience. Non-limiting examples may include a scenic road, a mountain pass, a coastal street, a dart road, a characteristic intersection, and a famous place. Incorporating such a via-point in the route, and playing back a musical piece and/or a sound that matches the mood at the nice-moment place makes it possible to enhance the joy of the drive. In this sense, the nice-moment place to be registered in the nice-moment place DB as the via-point may include a location, a road, or both passing through which is expected to give the user specific experience.

In particular, the nice-moment place according to the example embodiment may further include a location, a road, or both that are selected under the criterion of scenic quality.

Hence, it is possible to offer the user the nice-moment place of good scenery, and to perform sound playback suitable for the place during the drive.

The information processor 1 according to the example embodiment may include a navigator configured to provide guidance for a route to be traveled by a vehicle. For example, the via-point may further include a location, a road, or both that are decided on the basis of a characteristic of the vehicle.

Vehicles differ in their characteristics according to vehicle models and/or according to manufacturers. For example, in general, there are categories such as SUVs, compact cars, and family cars. There are also differences in vehicle types such as standard-sized cars and mini cars. In addition, automobile manufacturers have different design ideas. Accordingly, from the viewpoint of great experience in driving, suitable nice-moment places may differ according to, for example, the vehicle types or the manufacturers. For example, SUVs are able to enjoy a mountain pass, while mini cars are able to enjoy a flatter and more scenic road rather than a mountain pass. Setting the nice-moment place in accordance with the characteristics of the vehicle makes it possible to offer the proposed course where the performance and the appealingness of the relevant vehicle are easily appreciated, or to offer the proposed course that is more desirable to the occupant.

The information processor 1 according to the example embodiment may further include the audio recording unit 23 configured to perform processing of recording the audio message to the storage medium. The sound data to be subjected to the output control may include the audio message recorded by the audio recording unit 23.

This makes it possible, for example, when passing through near the stop-by spot or the nice-moment place, to playback the audio message that matches the mood. Hence, it is possible for the user to produce a staging effect that a specific message is heard by the fellow passenger at, for example, the nice-moment place during the drive.

In the example embodiment, the sound data may include the data on the musical piece. The data on the musical piece may be held by the information processor 1 or by the server 42 that is able to communicate with the information processor 1.

That is, the sound data to be played back may be data held in the information processor 1, or alternatively, the sound data to be played back may be data to be acquired by downloading or streaming from the external server 42.

Hence, it is possible to acquire, for example, musical pieces and/or sound effects from a variety of sources, to playback them, and to use them for the staging effect during the drive.

The information processor 1 according to the second embodiment may include the data recording unit 25 and the second determination unit 28. The data recording unit 25 may perform processing of recording, to a storage medium, the information summarized in FIG. 17, i.e., the character 200, the character voice data corresponding to the character 200, and the output condition of the character voice data in associated relation with one another. The second determination unit 28 may determine whether or not the output condition is satisfied. On the condition that the second determination unit 28 determines that the output condition is satisfied, the controller 29 may further make the output control of the character voice data recorded in the associated relation with the output condition. Refer to FIG. 18.

Hence, it is possible to provide entertainment with not only the playback of the musical piece but also various staging effects such as a DJ-style talk.

In the second embodiment, the output condition may be that the current position detected by the detection unit 26 is within a predetermined range from a specific position. The specific position may include the starting point, the destination point, or the via-point.

This causes the character voice data to be played back as appropriate at the stop-by spot or the nice-moment place. Hence, it is possible to provide the staging effect of the mood that matches the location and/or the scenery, leading to greater amusement.

Furthermore, in the second embodiment, the moving image data of the character 200 may be recorded to a storage medium in associated relation with the character voice data. The controller 29 may perform the output control of the moving image data together with the character voice data. For example, a moving image of, for example, a DJ character may be outputted. Hence, it is possible to display the moving image of the character as appropriate in accordance with the character voice data at, for example, a specific via-point, making it possible to entertain the fellow passenger.

A program according to the example embodiment is a program that causes, for example, a CPU, a DSP, or a device including these to execute the processing as illustrated in FIG. 3, 9, 14, or 18.

That is, the program according to the example embodiment causes the information processor to execute processing including: acquiring information regarding the via-point; setting the course from the starting point to the destination point through the via-point in the singularity or in the plurality; performing the registration processing, the registration processing including associating the sound data with the via-point set on the course; detecting the current position; determining whether or not the current position detected by the detecting is within the predetermined range from the via-point; and making the output control of the sound data associated by the registration processing, on the basis of the determination result of the determining.

With such a program, it is possible to implement the above-described information processor 1 in, for example, a portable terminal device such as a smartphone and a tablet apparatus, a personal computer, or any other apparatus that is able to execute information processing.

The program that implements such an information processor 1 may be held in advance in, for example, an HDD as a recording medium incorporated in an apparatus such as a computer device, or a ROM in a microcomputer including a CPU. Alternatively, the program may be temporarily or permanently held, or recorded, in a removable recording medium such as a disk recording medium, a card type recording medium, or a stick type recording medium. In another alternative, the program may be installed in the information processor 1 from a removable recording medium, or may be downloaded through the network 41.

The sound output system according to the example embodiment includes the CPU 2 of the information processor 1, the non-volatile memory unit 5, and the vehicle audio system 40.

The sound data is held by the non-volatile memory unit 5. A playback control of the sound data associated with the via-point is executed by the control of the CPU 2 described above. An actual sound played back is outputted by the vehicle audio system 40. Thus, for example, the information processor 1 such as a smartphone and the vehicle audio system 40 cooperate with each other to realize the playback of, for example, the musical piece associated with the via-point, etc. as described above.

It is to be noted that the audio output system may include solely the information processor 1. That is, the sound output may be made with the use of, for example, a speaker of the audio output unit 8 of the information processor 1.

In another alternative, the sound data may be held in the server 42. The information processor 1 may sequentially download the sound data such as a requested musical piece from the server 42, in accordance with the current position, to make a sound output. As to, for example, the musical piece registered in accordance with the stop-by spot or the nice-moment place, the sound data may be downloaded as comes close to the vicinity of the stop-by spot or the nice-moment place.

According to the aspects of the technology, registration processing is performed in which sound data is associated with a via-point set on a course. The sound data is outputted on the condition that a current position is within a predetermined range from the via-point. Hence, it is possible to make a sound output, not only to offer route navigation but also to assist a driver and/or a fellow passenger in having greater experience and impression during a drive.

The CPU 2 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the CPU 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the CPU 2 illustrated in FIG. 1.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An information processor comprising:
   one or more processors; and
   one or more memories storing separate application programs, the separate application programs including a navigator program causing the one or more processors to execute a first processing, and a drive event designer program causing the one or more processors to execute a second processing different from the first processing, wherein
   the first processing includes providing a display of a navigation image to present a position of a vehicle on a map with a route guidance following a set course,
   the second processing includes:
      acquiring information regarding one or more via-points;
      setting the set course to be travelled by the vehicle from a starting point to a destination point through the one or more via-points;
      storing information on the set course in the one or more memories, the set course including the starting point, the destination point, and the one or more via-points:
      acquiring information regarding a relationship between a driver and a fellow passenger of the vehicle;
      prompting the driver of the vehicle to input a preferred musical piece for a specific location type, wherein the driver edits, adds, or deletes a musical piece associated with a via-point in accordance with preferences of the driver; registering, before a drive of the vehicle is started, a plurality of pieces of sound data corresponding to the one or more via-points;
      selecting, during the drive of the vehicle, sound data based on the relationship between the driver and the fellow passenger of the vehicle from the plurality of pieces of the sound data, and based on the designation of a musical piece by the driver to playback at each via-point on the route;
      receiving information on a current position of the vehicle;
      repeating a comparison of the current position of the vehicle with a first via-point to determine that the current position is within a predetermined range of the first via-point;
      in response to completing the setting of the set course to be travelled by the vehicle, causing a display screen of the vehicle to display, within the display screen, instructions including first character strings to instruct a driver of the vehicle to move the vehicle to the starting point;
      in response to detecting arrival of the vehicle at the starting point, causing the display screen to display, in place of the instructions, a button including second character strings to prompt the driver of the vehicle to confirm that the driver starts driving the vehicle based on the set course on the display screen;
      starting, in response to detecting an operation of the driver of the vehicle on the button, cooperation with the first processing of the navigator program for starting to provide guidance of the set course; and controlling based on determining that the detected current position of the vehicle is within the predetermined range of the first via-point and detecting the operation of the driver of the vehicle on the button, an audio output unit to play sound based on the sound data associated with the first via-point,
wherein the musical piece designated by the driver is played back at a corresponding via-point along the route.

2. The information processor according to claim 1,
wherein the second processing further includes acquiring information regarding an operation purpose, and
wherein be audio output unit to play sound is controlled based on sound data selected further based on the acquired information regarding the operation purpose.

3. The information processor according to claim 1, wherein the one or more via-points include a first location, a first road, or both that are registered in a via-point database with a purpose of passing through.

4. The information processor according to claim 3, wherein the one or more via-points include a second location, a second road, or both that are selected under a criterion of scenic quality.

5. The information processor according to claim 3, wherein the one or more via-points include a second location, a second road, or both that are decided on a basis of characteristic of the vehicle.

6. The information processor according to claim 1, wherein the second processing includes performing processing of recording an audio message to a storage medium, wherein the sound data includes the audio message recorded by the driver.

7. The information processor according to claim 1,
wherein the second processing includes controlling, based on determining that the current position of the vehicle is outside the predetermined range of the first via-point, the audio output unit to play a musical piece based on data other than the sound data associated with the first via-point, and
wherein the data on the musical piece is held by the information processor or by a server that communicates with the information processor.

8. The information processor according to claim 1,
wherein the second processing further includes:
processing of recording, to a storage medium, a character, character voice data corresponding to the character, and an output condition of the character voice data in associated relation with one another;
determining that the output condition is satisfied, and
controlling, in response to determining that the output condition is satisfied, the audio output unit to play sound based on the character voice data recorded in the associated relation with the output condition.

9. The information processor according to claim 8, wherein the output condition is that the current position of the vehicle is within the predetermined range of each of the one or more via-points.

10. The information processor according to claim 8, wherein the second processing further includes processing of recording, to a storage medium, character moving image data in associated relation with the character voice data, and the controller controls a display based on the character moving image data together with the character voice data.

11. The information processor according to claim 1, wherein the second processing further includes acquiring information on a score assigned to each via-point, and the course setting unit is configured to select the one or more via-points from via-points in accordance with the score.

12. The information processor according to claim 1, wherein the second processing causes the one or more processors to:
based on the start of displaying the guidance on the course, repeat the comparison of the current position with each of the one or more via-points.

13. The information processor according to claim 1, wherein
the starting point is selected from predetermined starting point candidates based on an operation of the driver of the vehicle,
when causing the display screen of the vehicle to display the instructions, the display screen displays the instructions in a first region in the display screen, displays a map and the set course denoted on the map in a second region different from the first region in the display screen, and displays information on the sound data in a third region different from the first region and the second region in the display screen, and
when causing the display screen of the vehicle to display the button, the display screen displays the button in the first region in place of the instructions, displays the map and the set course denoted on the map in the second region, and displays the information on the sound data in the third region.

14. An information processing method, the information processing method is configured to executed using one or more processors, and one or more memories stored separate application programs, the separate application programs including a navigator program causing the one or more processors to execute a first processing and a drive event designer program causing the one or more processors to execute a second processing different from the first processing, the method comprising:
executing the first processing, the first processing including providing a display of a navigation image to present a position of a vehicle on map with a route guidance following a set course, and
executing the second processing, the second processing including:
acquiring information regarding one or more via-points;
setting the set course to be travelled by the vehicle from a starting point to a destination point through the one or more via-points;
storing information on the set course in the one or more memories, the set course including the starting point, the destination point and the one or more via-points; acquiring information regarding a relationship between a driver and a fellow passenger of the vehicle; prompting the driver of the vehicle to input a preferred musical piece for a specific location type, wherein the driver edits, adds, or deletes a musical piece associated with a via-point in accordance with preferences of the driver; registering, before a drive of the vehicle is started, a plurality of pieces of sound data corresponding to the one or more via-points; selecting, during the drive of the vehicle, sound data based on the relationship between the driver and the fellow passenger of the vehicle from the plurality of pieces of the sound data, and based on the designation of a musical piece by the driver to playback at each via-point on the route; receiving information on a current position of the vehicle; repeating a comparison of the current position of the vehicle with a first via-point to determine that the current position of the vehicle is within a predetermined range of the first via-point;

in response to completing the setting of the set course to be travelled by the vehicle, causing a display screen of the vehicle to display, within the display screen, instructions including first character strings to instruct a driver of the vehicle to move the vehicle to the starting point;

in response to detecting arrival of the vehicle at the starting point, causing the display screen to display, in place of the instructions, a button including second character strings to prompt the driver of the vehicle to confirm that the driver starts driving the vehicle based on the set course on the display screen;

starting, in response to detecting an operation of the driver of the vehicle on the button, cooperation with the first processing of the navigator program for starting to provide guidance of the set course; and controlling, based on determining that the current position of the vehicle is within the predetermined range of the first via-point and detecting the operation of the driver of the vehicle on the button, an audio output unit to play sound based on sound data associated with the first via-point, wherein the musical piece designated by the driver is played back at a corresponding via-point along the route.

15. The information processing method according to claim 14, wherein the second processing comprising:

acquiring information regarding a relationship between a driver and a fellow passenger of the vehicle;

registering, before a drive of the vehicle is started, a plurality of pieces of the sound data corresponding to the one or more via-points;

selecting, during the drive of the vehicle, sound data associated with the first via-point based on the relationship between the driver and the fellow passenger of the vehicle from the plurality of pieces of the sound data; and controlling the audio output unit to play sound based on the selected sound data as the sound data associated with the first via-point.

16. A non-transitory computer-readable recording medium containing a drive event designer program, the program causing, when executed by a computer, the computer to implement a second processing, the computer comprising one or more processors, and one or more memories configured to store separate application programs, the separate application programs including the drive event designer program, and a navigator program causing the one or more processors to implement a first processing which includes providing a display of a navigation image to present a position of a vehicle on a map with a route guidance following a set course, the second processing being different from the first processing, the second processing comprising:

acquiring information regarding one or more via-points;

setting the set course to be travelled by the vehicle from a starting point to a destination point through the one or more via-points;

storing information on the set course in the one or more memories, the set course including the starting point, the destination point, and the one or more via-points;

acquiring information regarding a relationship between a driver and a fellow passenger of the vehicle; prompting the driver of the vehicle to input a preferred musical piece for a specific location type, wherein the driver edits, adds, or deletes a musical piece associated with a via-point in accordance with preferences of the driver; registering, before a drive of the vehicle is started, a plurality of pieces of sound data corresponding to the one or more via-points; selecting, during the drive of the vehicle, sound data based on the relationship between the driver and the fellow passenger of the vehicle from the plurality of pieces of the sound data, and based on the designation of a musical piece by the driver to playback at each via-point on the route; receiving information on a current position of the vehicle; repeating a comparison of the current position of the vehicle with a first via-point to determine that the current position of the vehicle is within a predetermined range of the first via-point;

in response to completing the setting of the set course to be travelled by the vehicle, causing a display screen of the vehicle to display, within the display screen, instructions including first character strings to instruct a driver of the vehicle to move the vehicle to the starting point;

in response to detecting arrival of the vehicle at the starting point, causing the display screen to display, in place of the instructions, a button including second character strings to prompt the driver of the vehicle to confirm that the driver starts driving the vehicle based on the set course on the display screen;

starting, in response to detecting an operation of the driver of the vehicle on the button, cooperation with the first processing of the navigator program for starting to provide guidance of the set course; and controlling, based on determining that the current position of the vehicle is within the predetermined range of the first via-point and detecting the operation of the driver of the vehicle on the button, an audio output unit to play sound based on sound data associated with the first via-point, wherein the musical piece designated by the driver is played back at a corresponding via-point along the route.

17. The non-transitory computer-readable recording medium according to claim 13, wherein the second processing comprising:

acquiring information regarding a relationship between a driver and a fellow passenger of the vehicle;

registering, before a drive of the vehicle is started, a plurality of pieces of the sound data corresponding to the one or more via-points;

selecting, during the drive of the vehicle, sound data associated with the first via-point based on the relationship between the driver and the fellow passenger of the vehicle from the plurality of pieces of the sound data; and controlling the audio output unit to play sound based on the selected sound data as the sound data associated with the first via-point.

18. An information processor comprising:

circuitry configured to storing separate application programs, the separate application programs including a navigator program causing one or more processors to execute a first processing, and a drive event designer program causing the one or more processors to execute a second processing different from the first processing, wherein the first processing includes providing a display of a navigation image to present a position of a vehicle on map with a route guidance following a set course, and the second processing includes:
acquiring information regarding one or more via-points;
setting the set course to be travelled by the vehicle from a starting point to a destination point through the one or more via-points;
storing information on the set course in one or more memories, the set course including the starting point, the destination point and the one or more via-points;
acquiring information regarding a relationship between a driver and a fellow passenger of the vehicle; prompting the driver of the vehicle to input a preferred musical piece for a specific location type, wherein the driver edits, adds, or deletes a musical piece associated with a via-point in accordance with preferences of the driver; registering, before a drive of the vehicle is started, a plurality of pieces of sound data corresponding to the one or more via-points; selecting, during the drive of the vehicle, sound data based on the relationship between the driver and the fellow passenger of the vehicle from the plurality of pieces of the sound data, and based on the designation of a musical piece by the driver to playback at each via-point on the route; receiving information on a current position of the vehicle; repeating a comparison of the current position of the vehicle with a first via-point to determine that the current position of the vehicle is within a predetermined range of the first via-point;
in response to completing the setting of the set course to be travelled by the vehicle, causing a display screen of the vehicle to display, within the display screen, instructions including first character strings to instruct a driver of the vehicle to move the vehicle to the starting point;
in response to detecting arrival of the vehicle at the starting point, causing the display screen to display, in place of the instructions, a button including second character strings to prompt the driver of the vehicle to confirm that the driver starts driving the vehicle based on the set course on the display screen;
starting, in response to detecting an operation of the driver of the vehicle on the button, cooperation with the first processing of the navigator program for starting to provide guidance of the set course;
controlling, based on determining that the current position of the vehicle is within the predetermined range of the first via-point and detecting the operation of the driver of the vehicle on the button, an audio output unit to play sound based on sound data associated with the first via-point,
wherein the musical piece designated by the driver is played back at a corresponding via-point along the route.

19. The information processor according to claim 18, wherein the second processing causes the circuitry to:
acquire information regarding a relationship between a driver and a fellow passenger of the vehicle;
register, before a drive of the vehicle is started, a plurality of pieces of the sound data corresponding to the one or more via-points;
select, during the drive of the vehicle, sound data based on the relationship between the driver and the fellow passenger of the vehicle from the plurality of pieces of the sound data; and
control the audio output unit to play sound based on the selected sound data as the sound data associated with the first via-point.

\* \* \* \* \*